US00RE47970E

(19) United States
(12) Reissued Patent
Walter et al.

(10) Patent Number: US RE47,970 E
(45) Date of Reissued Patent: May 5, 2020

(54) CART

(71) Applicant: AMSA, Inc., Boulder, CO (US)

(72) Inventors: Ivor Michel Walter, Boulder, CO (US); Paul Jensen, Boulder, CO (US); Ning Siu Sin, Hong Kong (CN); Stefan Berkower, Boulder, CO (US); Jonathan Peot, Boulder, CO (US)

(73) Assignee: AMSA, INC., Boulder, CO (US)

(21) Appl. No.: 29/628,898

(22) Filed: Dec. 8, 2017

Related U.S. Patent Documents

Reissue of:
(64) Patent No.: Des. 746,012
Issued: Dec. 22, 2015
Appl. No.: 29/496,335
Filed: Jul. 11, 2014

(51) LOC (12) Cl. ..... 12-02
(52) U.S. Cl.
USPC ..... D34/12; D34/17
(58) Field of Classification Search
USPC ..... D34/12–17, 21, 22, 23, 24, 25, 26
CPC .... B62B 3/02; B62B 3/00; B62B 3/10; B62B 3/006; B62B 3/002; B62B 5/06; B62B 5/04; B62B 5/0083
See application file for complete search history.

(56) References Cited

U.S. PATENT DOCUMENTS

| | | | | | |
|---|---|---|---|---|---|
| 2,764,419 | A | | 9/1956 | Enders | |
| 3,429,403 | A | | 2/1969 | Dreschler et al. | |
| 3,879,053 | A | * | 4/1975 | Chvala | 280/6.15 |
| 3,912,291 | A | * | 10/1975 | Frisch | 280/33.992 |
| 3,993,319 | A | * | 11/1976 | Day | 280/33.992 |
| D246,301 | S | | 11/1977 | Trubiano | |
| D280,858 | S | | 10/1985 | Muellner et al. | |
| D282,499 | S | | 2/1986 | Alstrom | |
| 4,702,402 | A | * | 10/1987 | Ferri | 224/277 |
| 4,850,604 | A | | 7/1989 | Le Marchand et al. | |
| 5,149,114 | A | | 9/1992 | Lewandowski et al. | |
| D331,135 | S | | 11/1992 | Lewandowski et al. | |
| D365,904 | S | | 1/1996 | Adamson et al. | |
| D367,348 | S | | 2/1996 | Basharat | |
| 5,553,877 | A | | 9/1996 | Huang | |
| 5,595,394 | A | | 1/1997 | Adamson | |
| D386,873 | S | | 11/1997 | Langlois 'Estaintot et al. | |
| D399,625 | S | | 10/1998 | Murphy et al. | |
| 5,836,422 | A | | 11/1998 | Hurst | |
| D415,600 | S | | 10/1999 | Hsieh et al. | |
| D419,913 | S | | 2/2000 | Thomas et al. | |
| D449,913 | S | | 10/2001 | Walter | |
| D455,243 | S | | 4/2002 | Walter | |
| D472,026 | S | | 3/2003 | Walter | |
| D472,027 | S | | 3/2003 | Walter | |
| D490,200 | S | * | 5/2004 | Arceta | D34/17 |
| D548,421 | S | | 8/2007 | Walter | |
| D576,372 | S | | 9/2008 | Walter | |
| D580,617 | S | | 11/2008 | Walter | |
| D595,918 | S | | 7/2009 | Walter | |
| D615,723 | S | | 5/2010 | Walter | |
| D652,190 | S | * | 1/2012 | Slaton et al. | D34/17 |
| D669,242 | S | * | 10/2012 | Baldemor et al. | D34/12 |
| D685,154 | S | * | 6/2013 | Ambrefe et al. | D34/12 |
| 2002/0020989 | A1 | * | 2/2002 | Krawczyk | 280/651 |
| 2002/0079660 | A1 | * | 6/2002 | Shirai | 280/79.11 |
| 2003/0080523 | A1 | * | 5/2003 | Crespo-Ortiz | 280/47.34 |

OTHER PUBLICATIONS

Applicant AMSA, Inc. DBA VersaCart Systems Brochure for Orgill Spring Dealer Market 2015. 6 pages.
Applicant AMSA, Inc. DBA VersaCart Systems Brochure for Orgill Fall Dealer Market 2015. 6 pages.
Applicant AMSA, Inc. DBA VersaCart Systems Brochure for Orgill Fall Market 2012. 4 pages.
Applicant AMSA, Inc. DBA VersaCart Systems Brochure for Orgill Spring Dealer Market 2014. 6 pages.
Applicant AMSA, Inc. DBA VersaCart Systems Brochure for Orgill Fall Dealer Market 2014. 6 pages.
Applicant AMSA, Inc. DBA VersaCart Systems Retail & Distribution Catalog 2008. 50 pages.
Applicant AMSA, Inc. DBA VersaCart Systems Brochure for ACE Spring Convention 2013. 4 pages.
Applicant AMSA, Inc. DBA VersaCart Systems Brochure for ACE Spring Convention 2014. 4 pages.
Applicant AMSA, Inc. DBA VersaCart Systems Brochure for ACE Spring Convention 2015. 4 pages.
Applicant AMSA, Inc. DBA VersaCart Systems Brochure for ACE Spring Convention 2016. 4 pages.
Applicant AMSA, Inc. DBA VersaCart Systems Brochure for ACE Spring Market 2012. 2 pages.

(NEW)

Applicant AMSA, Inc. DBA VersaCart Systems Brochure for ACE Spring Convention 2017. 4 pages.
Applicant AMSA, Inc. DBA VersaCart Systems Brochure for Do It Best Spring Market 2017. 6 pages.
Applicant AMSA, Inc. DBA VersaCart Systems Brochure for Orgill Spring Dealer Market 2016. 6 pages.
Applicant AMSA, Inc. DBA VersaCart Systems Brochure for True Value Spring Reunion 2017. 2 pages.
Applicant AMSA, Inc. DBA VersaCart Systems SuperValu Expo flyer Aug. 3, 2016. 2 pages.
Applicant AMSA, Inc. DBA VersaCart Systems Unified Expo flyer Aug. 2016. 2 pages.
Applicant AMSA, Inc. DBA VersaCart Systems True Value flyer Fall Reunion 2017. 2 pages.
Applicant AMSA, Inc. DBA VersaCart Systems True Value flyer Fall Reunion 2016. 2 pages.
Applicant AMSA, Inc. DBA VersaCart Systems Brochure for ACE Fall Convention 2016. 4 pages.
Applicant AMSA, Inc. DBA VersaCart Systems Brochure for ACE Fall Convention 2017. 4 pages.
Applicant AMSA, Inc. DBA VersaCart Systems Brochure for Do It Best Fall Market 2016. 6 pages.
Applicant AMSA, Inc. DBA VersaCart Systems Brochure for Do It Best Fall Market 2017. 6 pages.
Applicant AMSA, Inc. DBA VersaCart Systems Brochure for Orgill Fall Dealer Market Las Vegas 2016. 6 pages.
Applicant AMSA, Inc. DBA VersaCart Systems Brochure for Orgill Fall Dealer Market Boston 2016. 6 pages.
MarkeTools Stock Trucks Scan of website [http://www.marketools.net/stocktrucks.html] showing prior art carts manufactured by MarkeTools.
www.winholt.com Customer and Stocking Cart with Plastic Deck Retractable Shelf.
http://www.premiercarts.com/warehouse_carts.htm Material Handling Warehouse Carts.
MarkeTools Stock Trucks Scan of website [http://www.marketools.net/stocktrucks.html] showing pior art carts manufactured by MarkeTools.

* cited by examiner

*Primary Examiner* — Philip S Hyder
(74) *Attorney, Agent, or Firm* — Polson Intellectual Property Law, PC; Margaret Polson; Christopher Sylvain

(57) CLAIM

The ornamental design for a cart, as shown and described.

DESCRIPTION

FIG. 1 is a front perspective view of *a first embodiment of* our new design for a cart;
FIG. 2 is a bottom perspective view thereof;
FIG. 3 is a right elevation view *thereof*, with the left side elevation view being a mirror image [thereof] *of FIG. 3*;
FIG. 4 is a front elevation view thereof;
FIG. 5 is a rear elevation view thereof;
FIG. 6 is a top plan view thereof;
FIG. 7 is a bottom plan view thereof;
FIG. 8 is a side view of the carrier deck section of the cart *of FIG. 1* in a raised position;
FIG. 9 is a rear perspective view of the carrier deck section shown removed from the rest of the cart *of FIG. 1*;
FIG. 10 is a bottom perspective view of FIG. 9;
FIG. 11 is a right side elevation view *of FIG. 9*, with the left side elevation view being a mirror image of FIG. [9] *11*;
FIG. 12 is a front side elevation view of FIG. 9;
FIG. 13 is a rear side elevation view [o] *of* FIG. 9;
FIG. 14 is a top plan view of FIG. 9;
FIG. 15 is a bottom plan view of FIG. 9;
FIG. 16 is a front perspective view of the wheel base section shown removed from the rest of the cart *of FIG. 1*;
FIG. 17 is a bottom perspective view of FIG. 16;
FIG. 18 is a right side elevation view, with the left side elevation being a mirror image of FIG. 16;
FIG. 19 is a front elevation view of FIG. 16;
FIG. 20 is a rear elevation view of FIG. 16;
FIG. 21 is a top plan view of FIG. 16;
FIG. 22 is a bottom plan view of FIG. 16;
FIG. 23 is a front perspective view for a second embodiment for a cart, it being understood that all the other surfaces are the same as the first embodiment; [and,]
FIG. 24 is a front perspective view of FIG. 23 showing the handles in an alternate position[.]*;*
*FIG. 25 is a front perspective view of a third embodiment of our new design for a cart;*
*FIG. 26 is a bottom perspective view of FIG. 25;*
*FIG. 27 is a right elevation view of FIG. 25, with the left side elevation view being a mirror image of FIG. 27;*
*FIG. 28 is a front elevation view of FIG. 25;*
*FIG. 29 is a rear elevation view of FIG. 25;*
*FIG. 30 is a top plan view of FIG. 25;*
*FIG. 31 is a bottom plan view of FIG. 25;*
*FIG. 32 is a side view of the carrier deck section of the cart of FIG. 25 in a raised position;*
*FIG. 33 is a rear perspective view of the carrier deck section shown removed from the rest of the cart of FIG. 25;*
*FIG. 34 is a bottom perspective view of FIG. 33;*
*FIG. 35 is a right side elevation view of FIG. 33, with the left side elevation view being a mirror image of FIG. 35;*
*FIG. 36 is a front side elevation view of FIG. 33;*
*FIG. 37 is a rear side elevation view of FIG. 33;*
*FIG. 38 is a top plan view of FIG. 33;*
*FIG. 39 is a bottom plan view of FIG. 33;*
*FIG. 40 is a front perspective view of the wheel base section shown removed from the rest of the cart of FIG. 25;*
*FIG. 41 is a bottom perspective view of FIG. 40;*
*FIG. 42 is a right side elevation view, with the left side elevation being a mirror image of FIG. 42;*
*FIG. 43 is a front elevation view of FIG. 40;*
*FIG. 44 is a rear elevation view of FIG. 40;*
*FIG. 45 is a top plan view of FIG. 40;*
*FIG. 46 is a bottom plan view of FIG. 40;*
*FIG. 47 is a front perspective view for a fourth embodiment for a cart, it being understood that all the other surfaces are the same as the first embodiment; and,*
*FIG. 48 is a front perspective view of FIG. 47 showing the handles in an alternate position.*
The features shown in broken lines in the drawing depict environmental subject matter only and form no part of the claimed design.
The carrier deck section and the wheel base section of the cart are being shown separately in FIGS. 9 through 22 *and FIGS. 33 through 46* for convenience of illustration.

1 Claim, 34 Drawing Sheets

Figure 1:
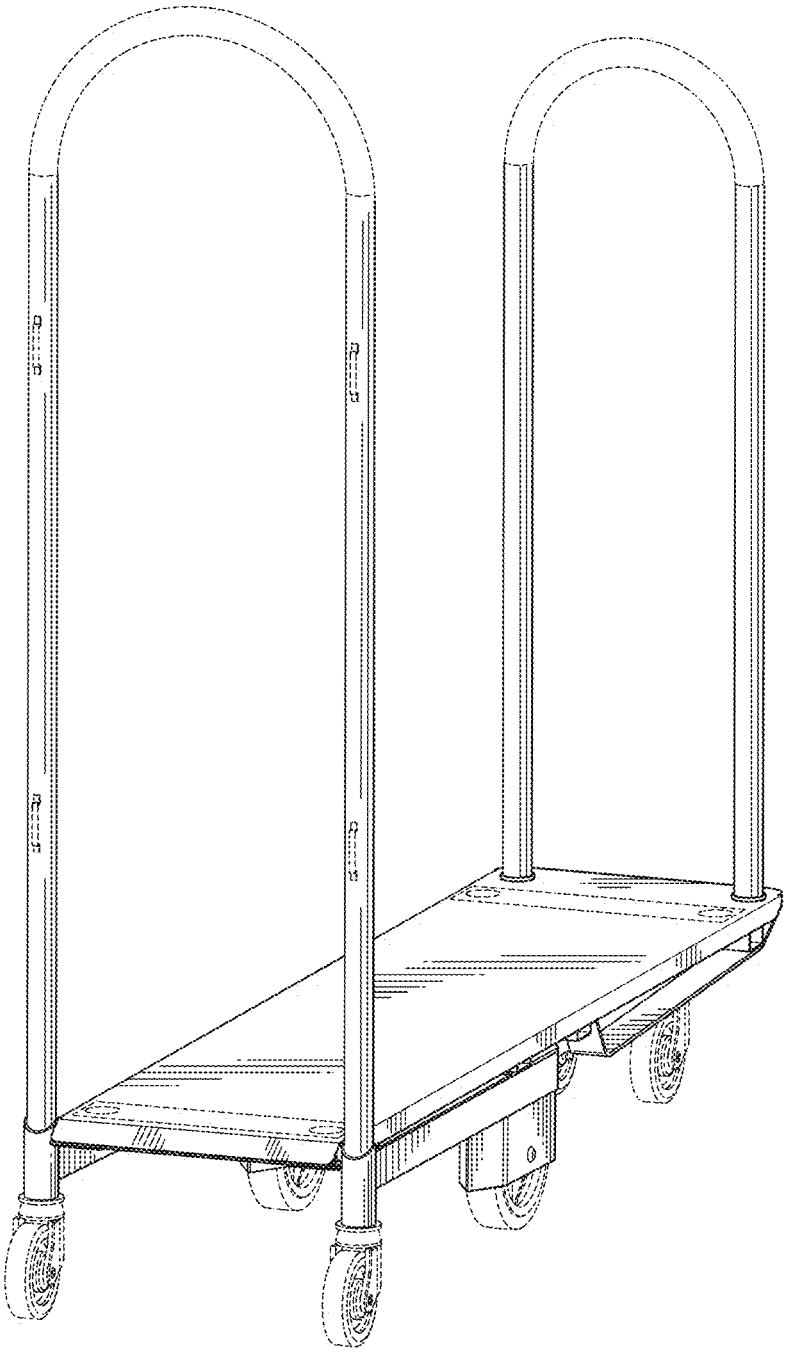
Figure 2:
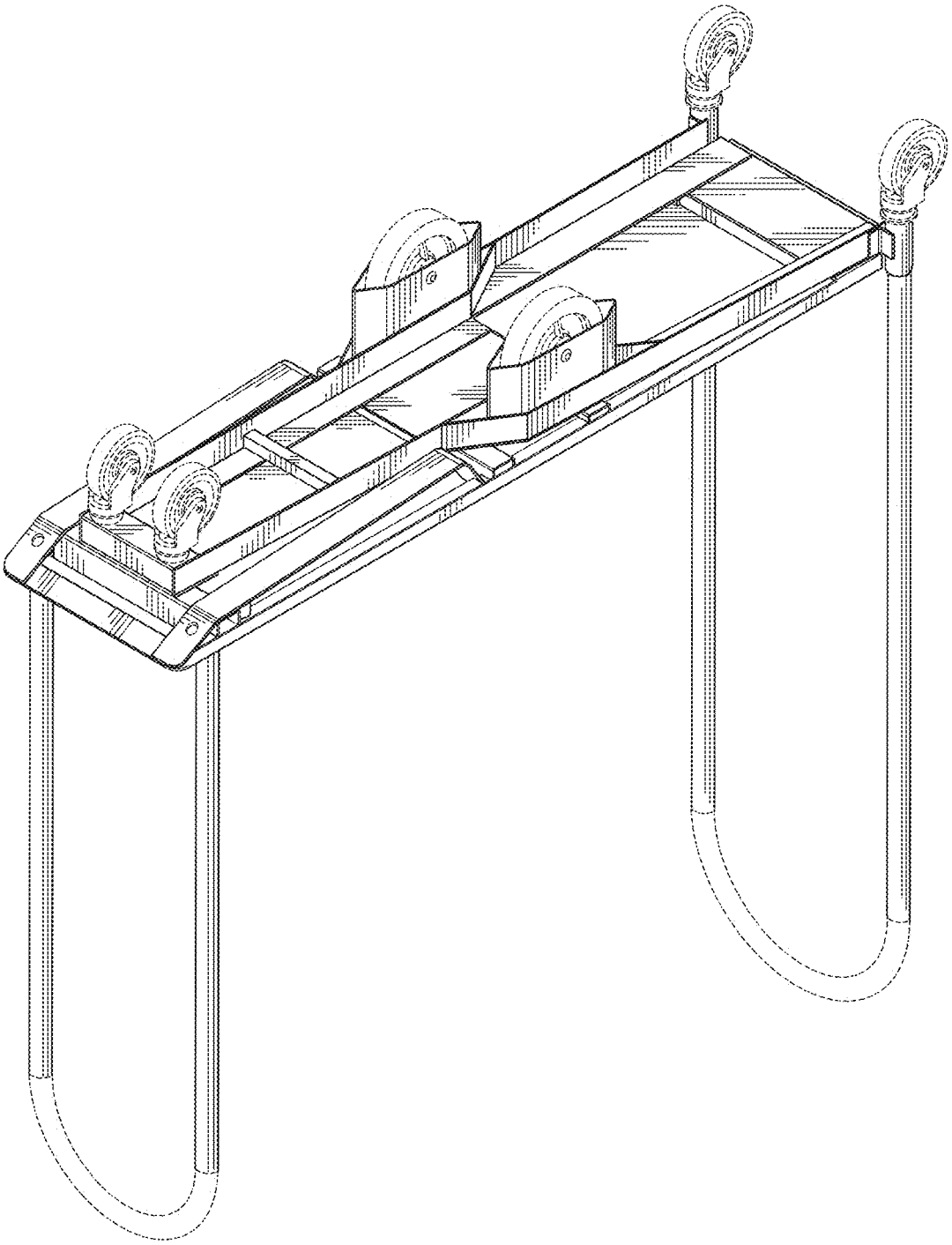
Figure 3:
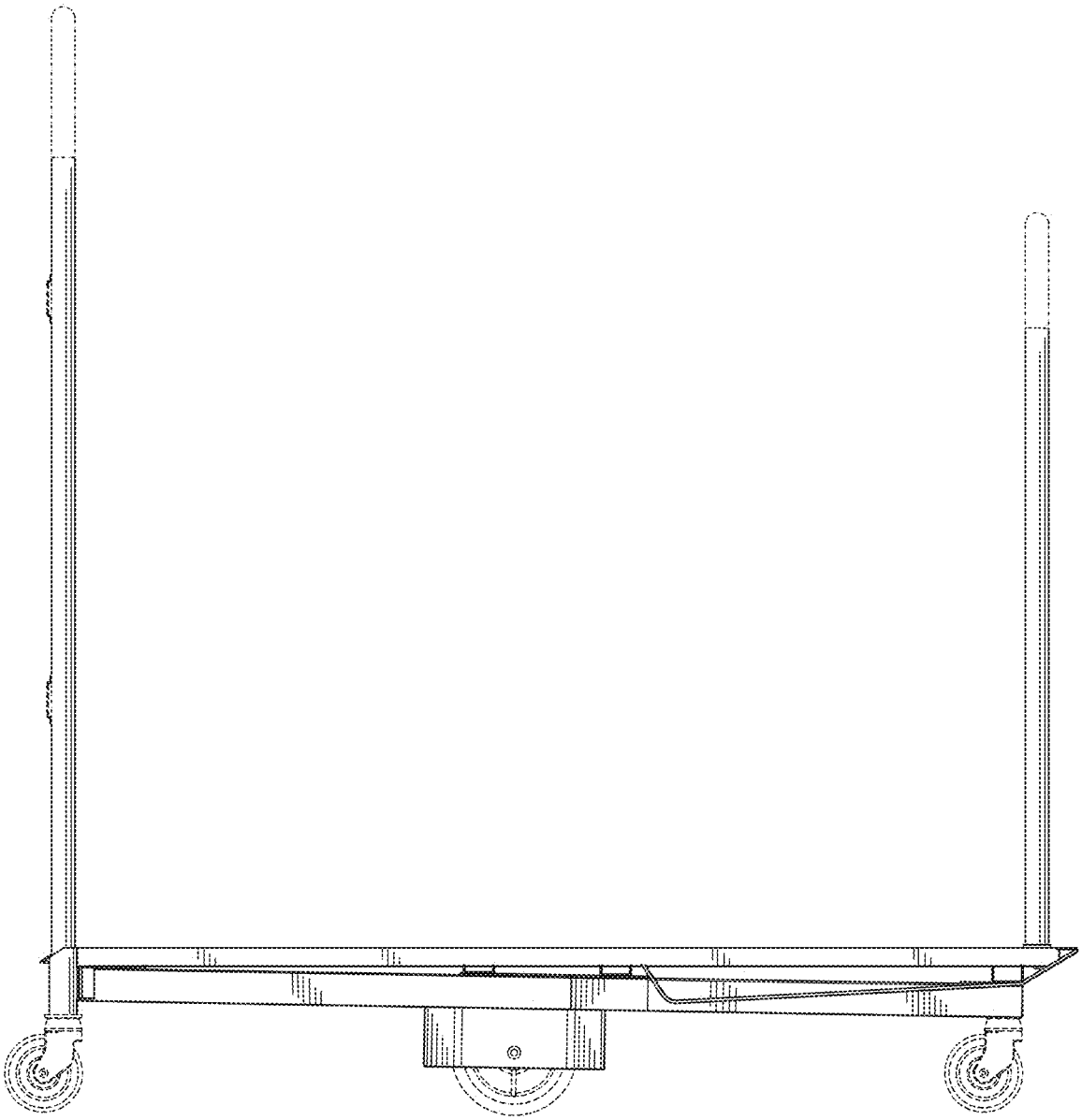
Figure 4:
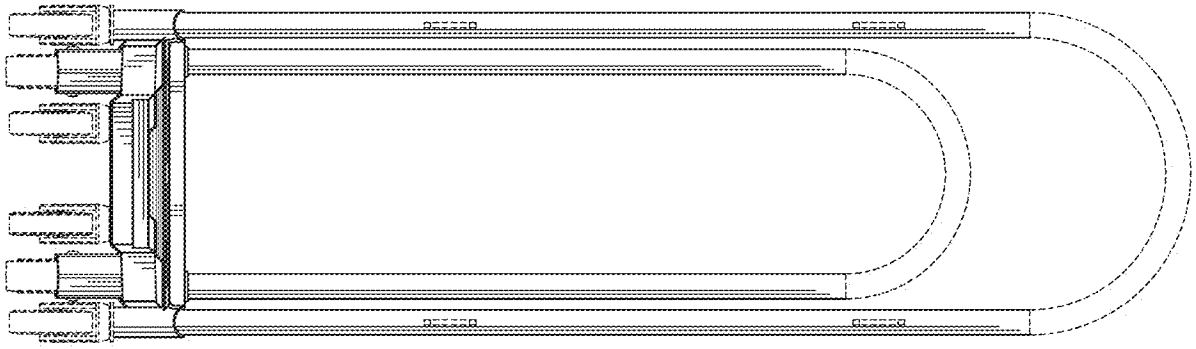
Figure 5:
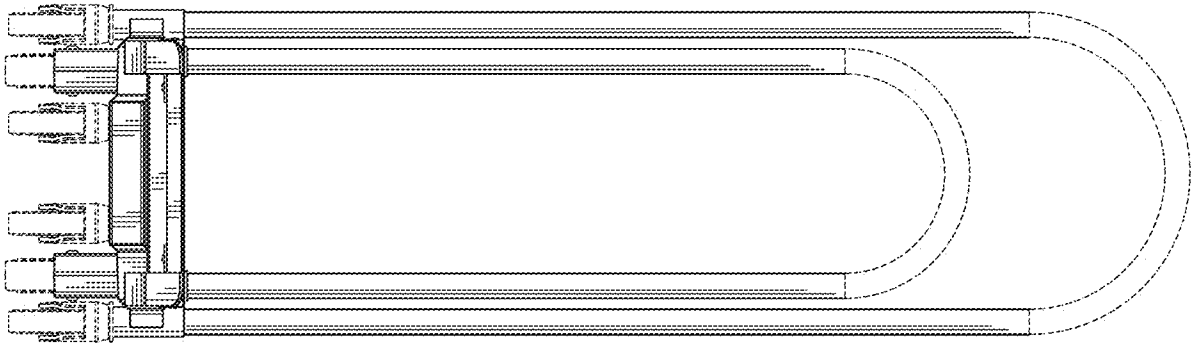
Figure 6:
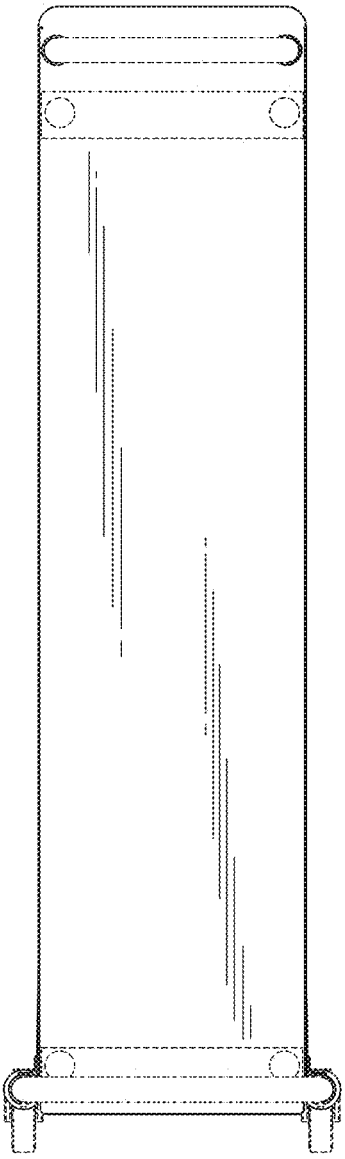
Figure 7:
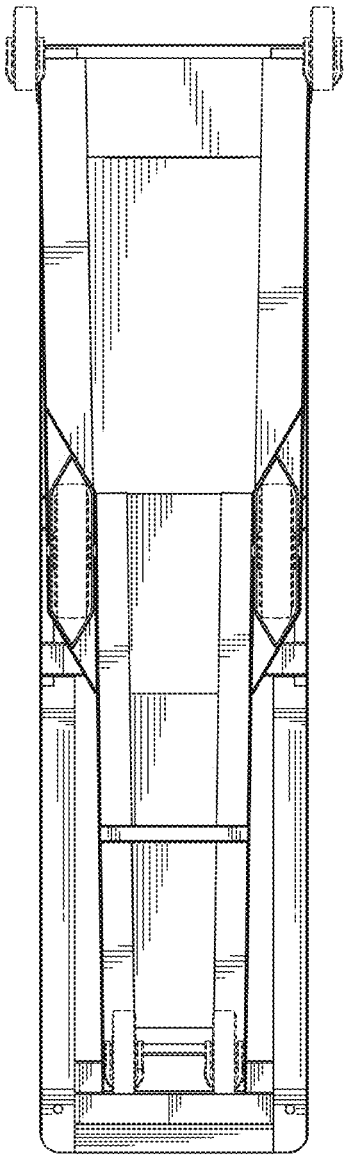
Figure 8:
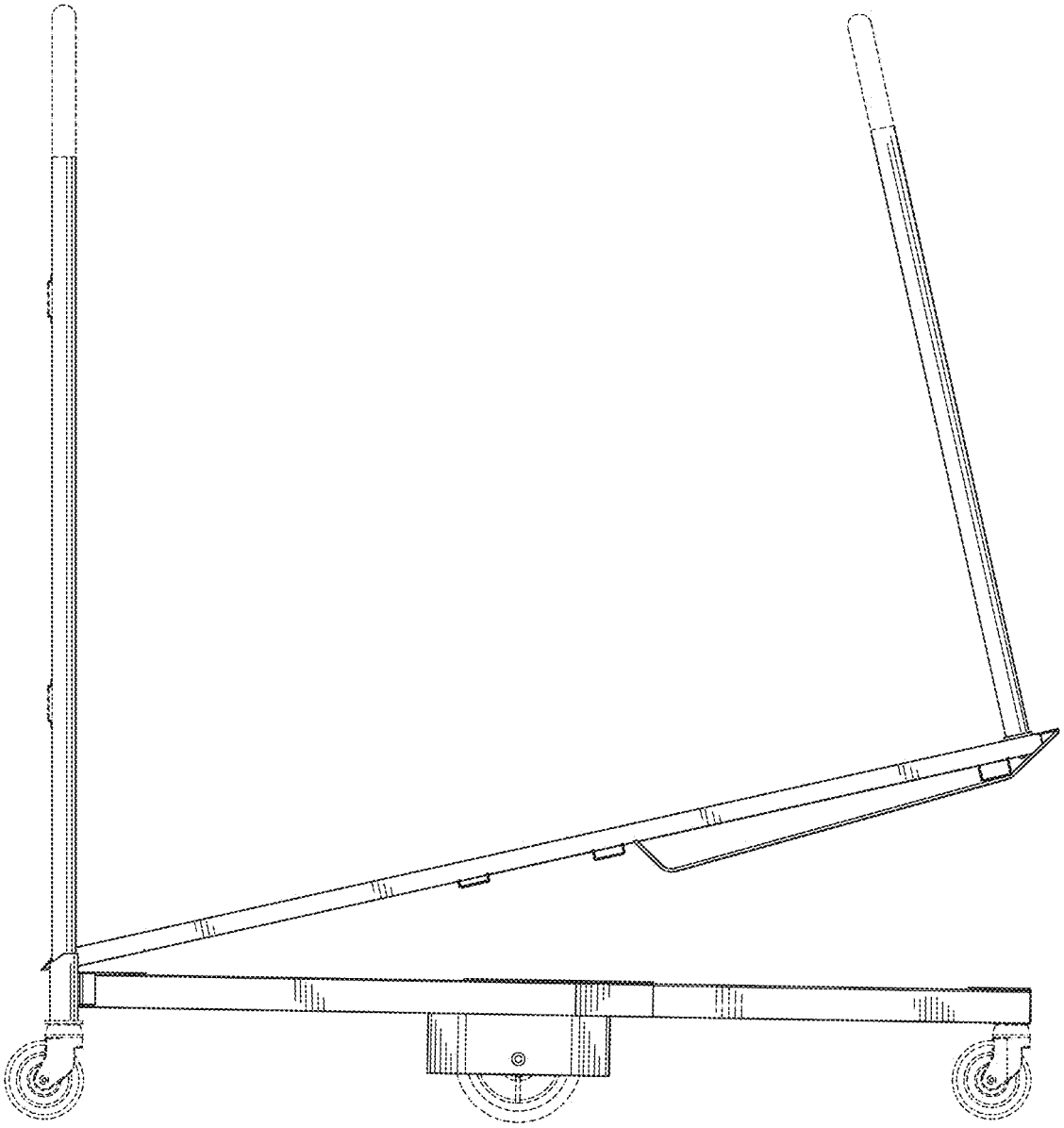
Figure 9:
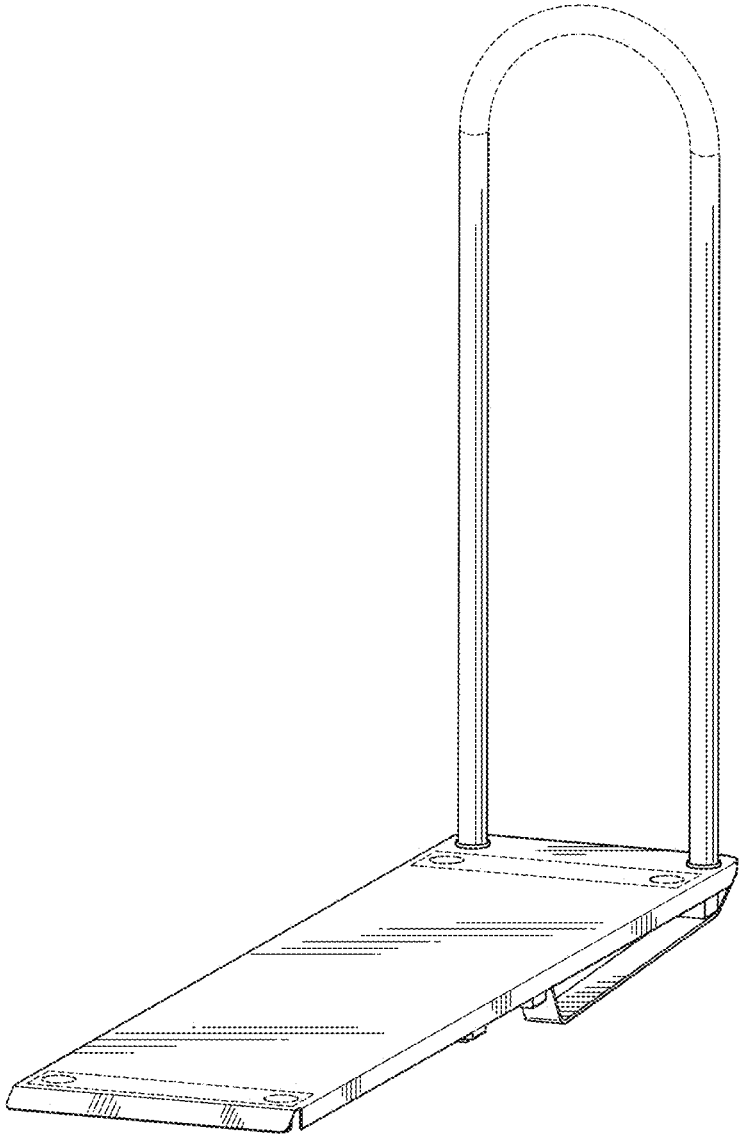
Figure 10:
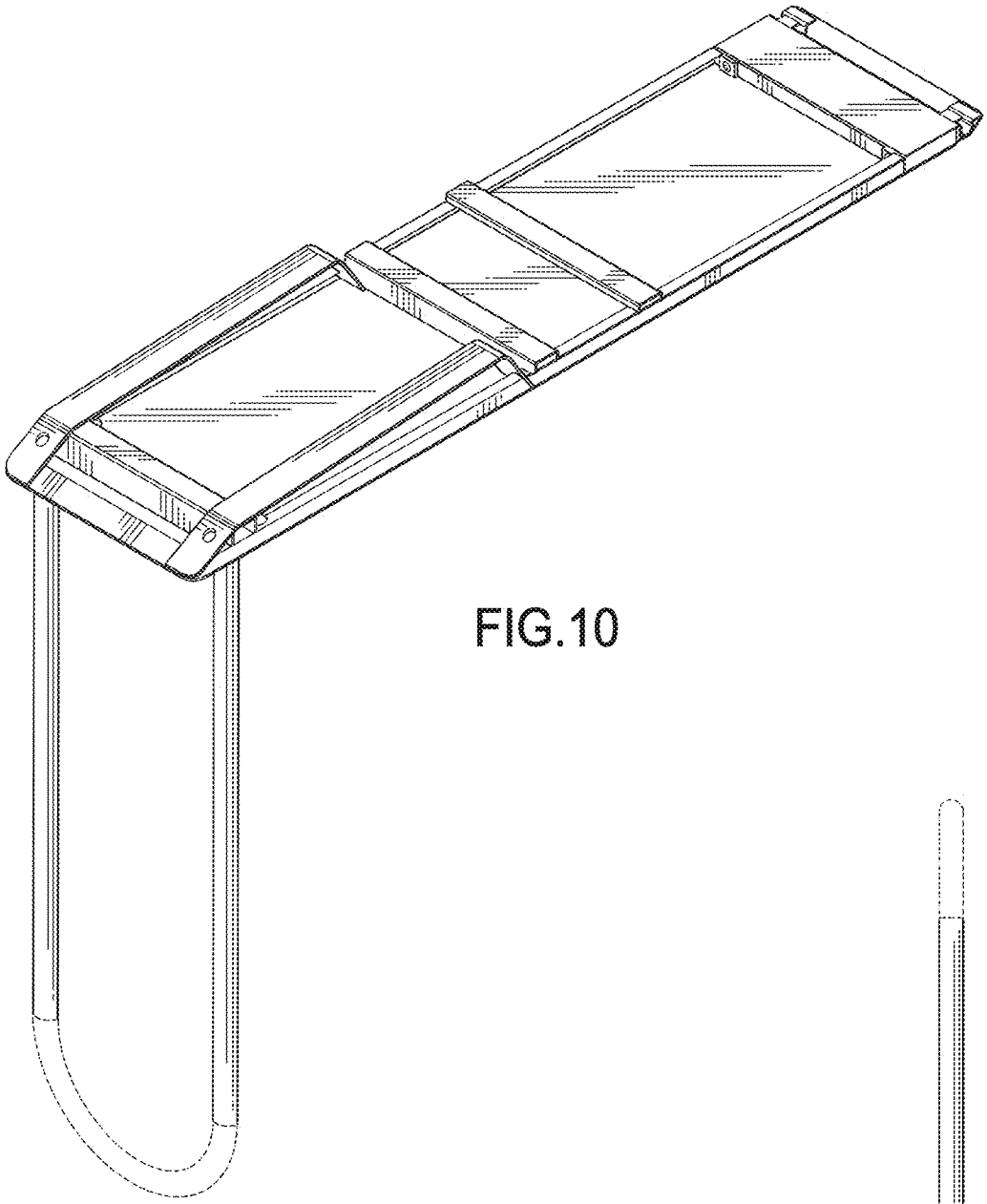
Figure 11:
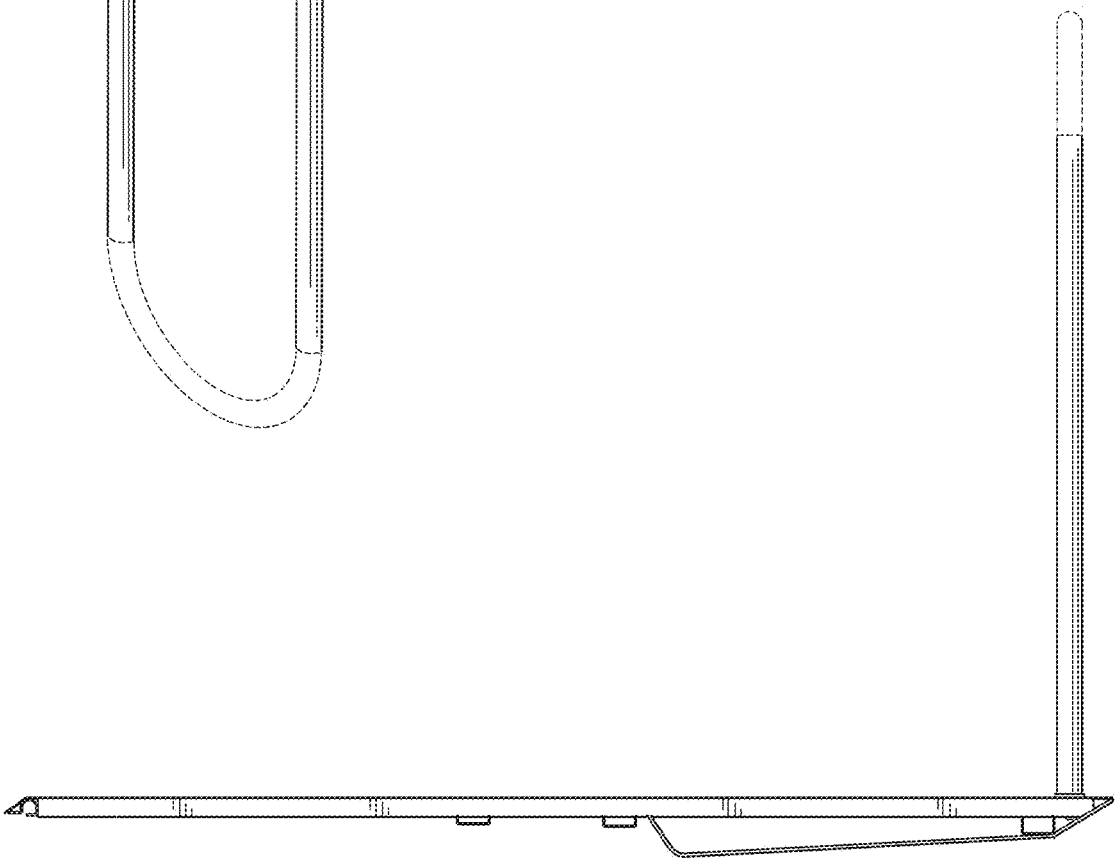
Figure 12:
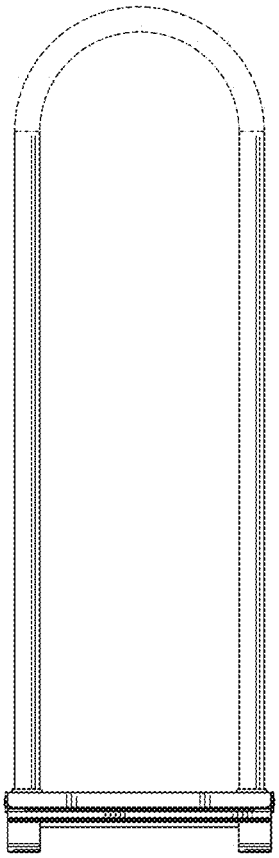
Figure 13:
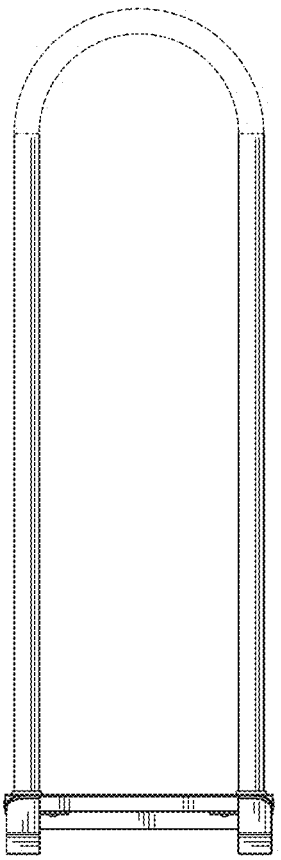
Figure 14:
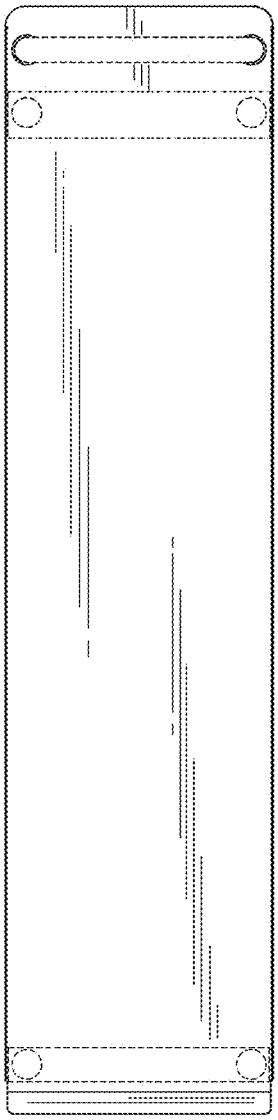
Figure 15:
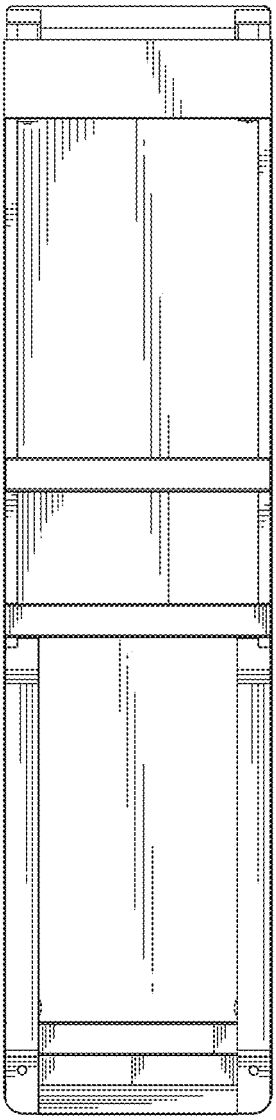
Figure 16:
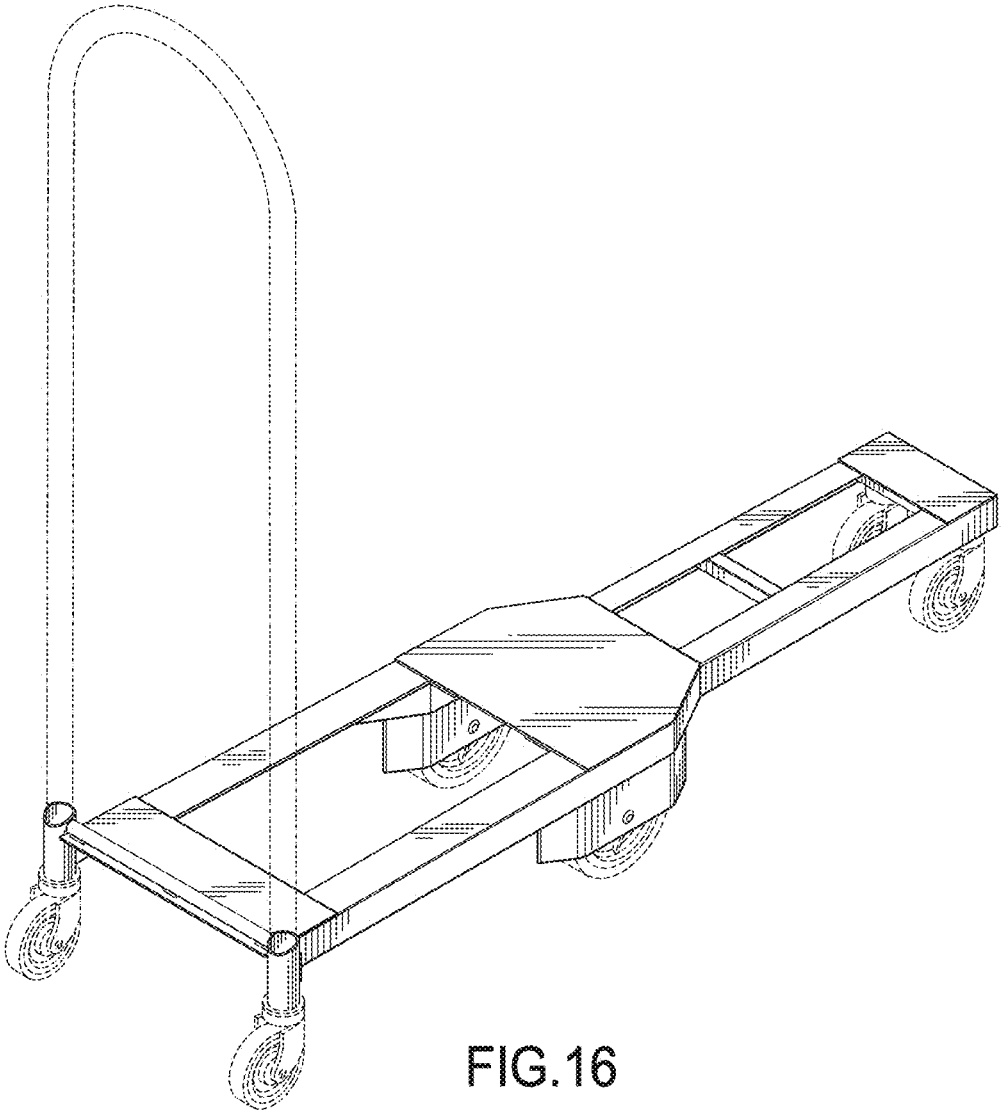
Figure 17:
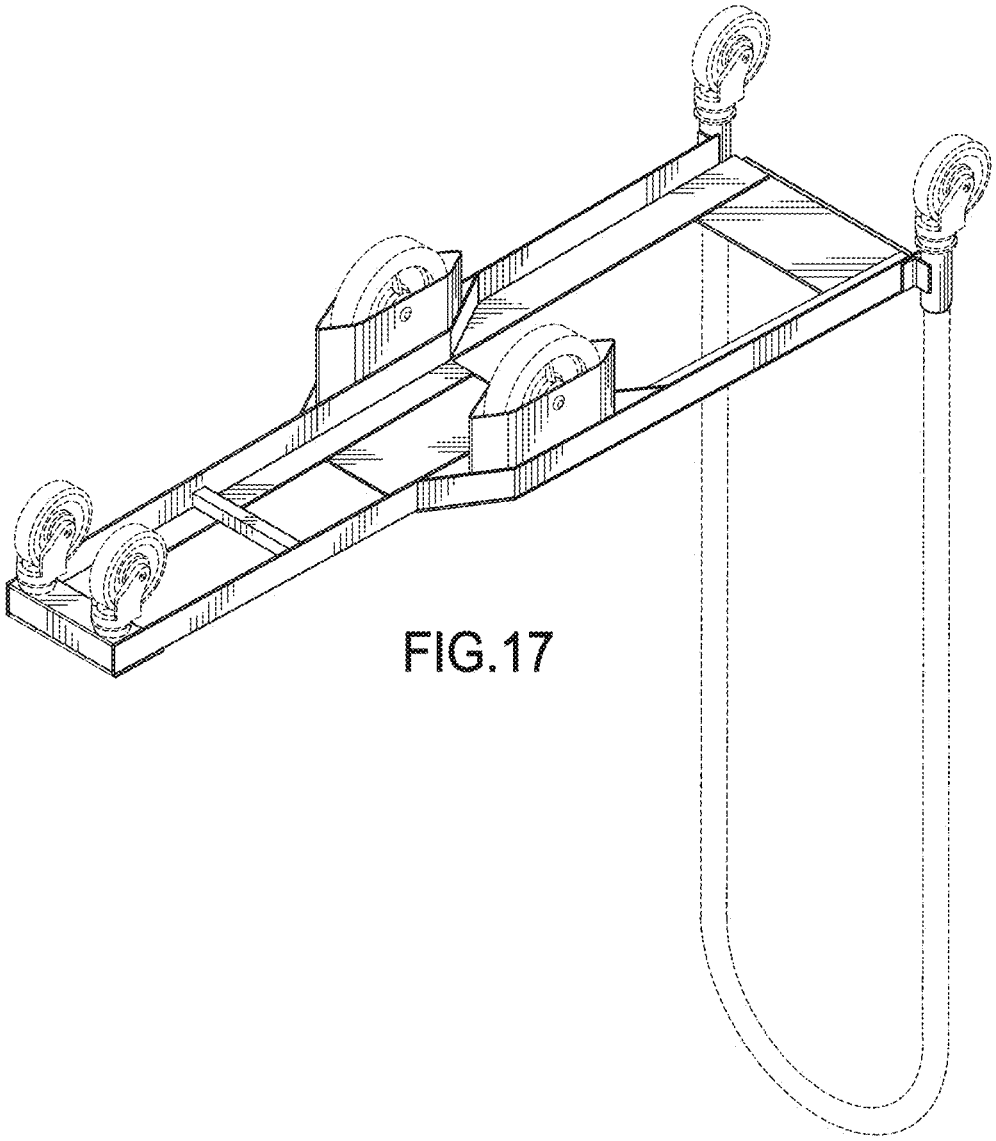
Figure 18:
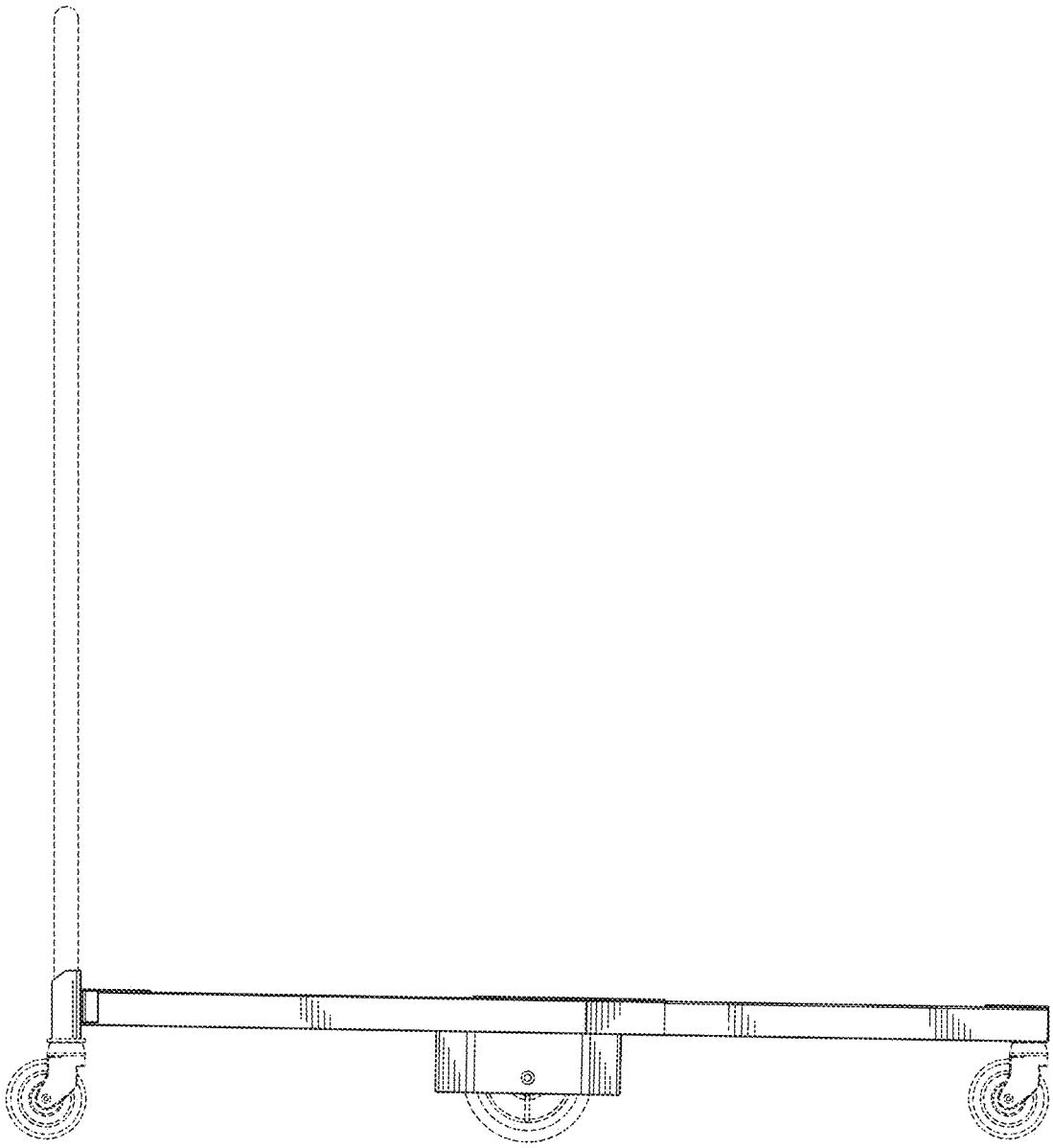
Figure 19:
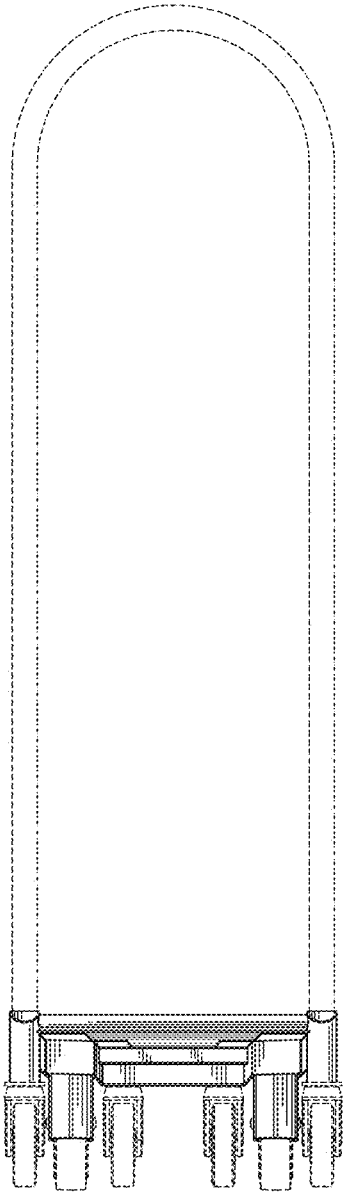
Figure 20:
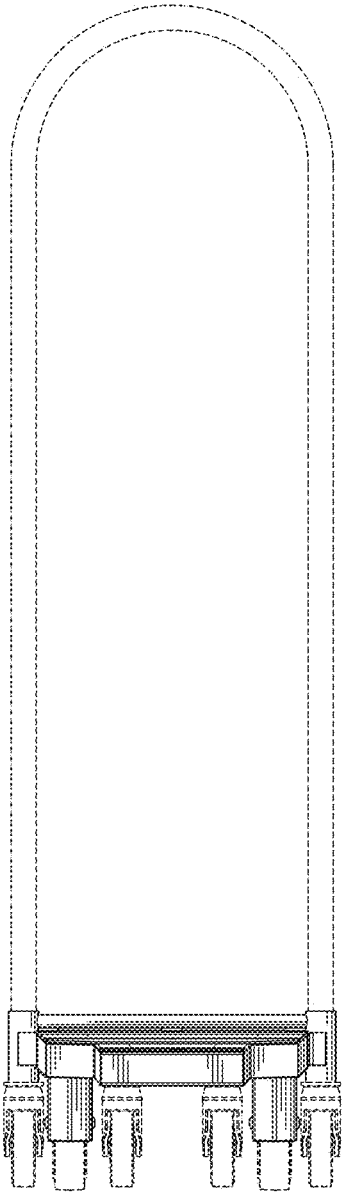
Figure 21:
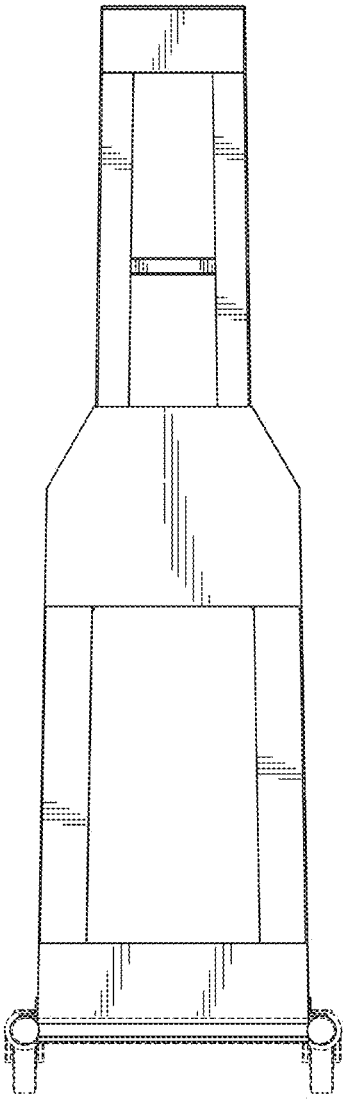
Figure 22:
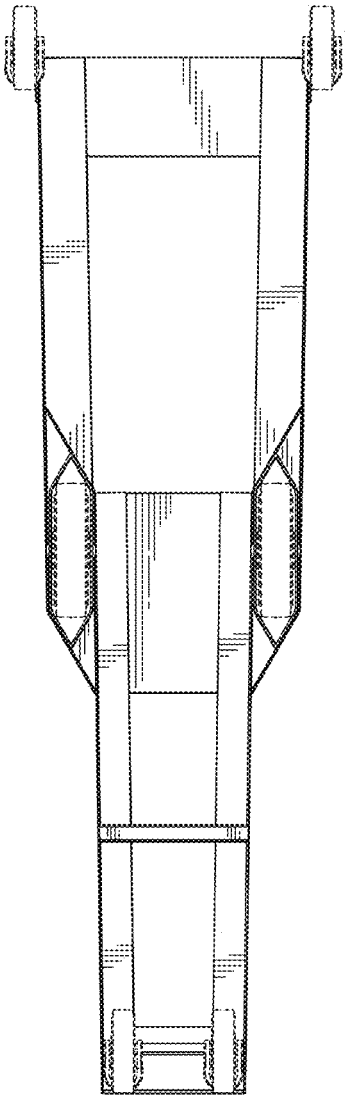
Figure 23:
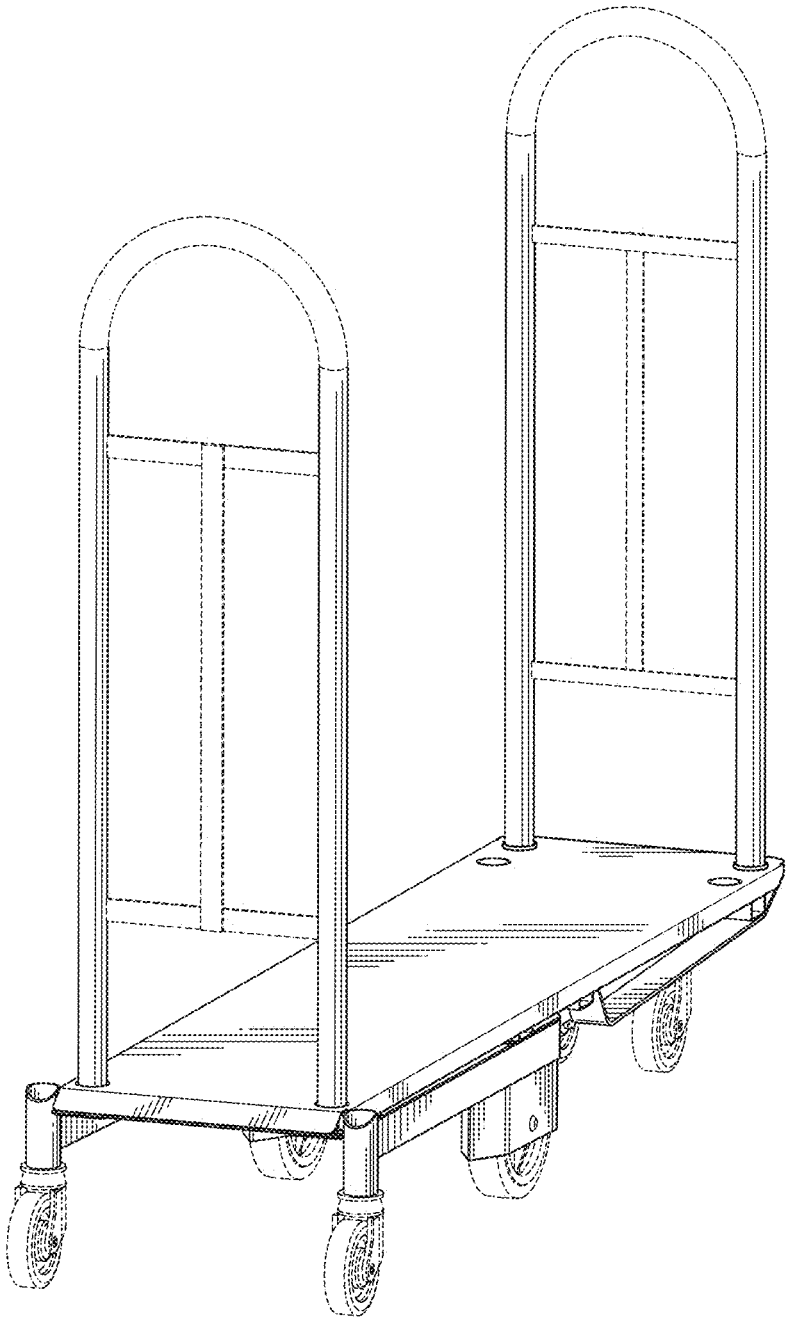
Figure 24:
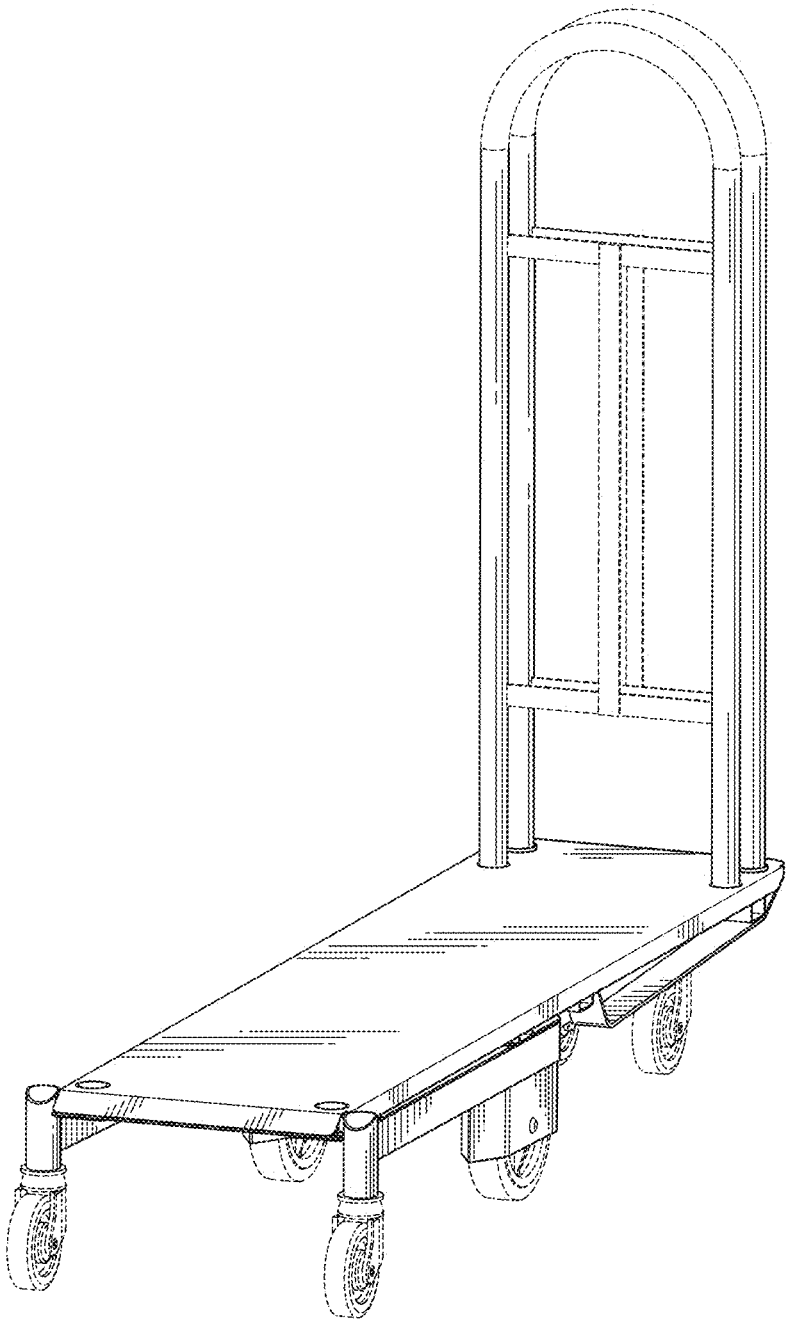

Matter enclosed in heavy brackets [ ] appears in the original patent but forms no part of this reissue; matter printed in italics indicates the additions made by reissue.

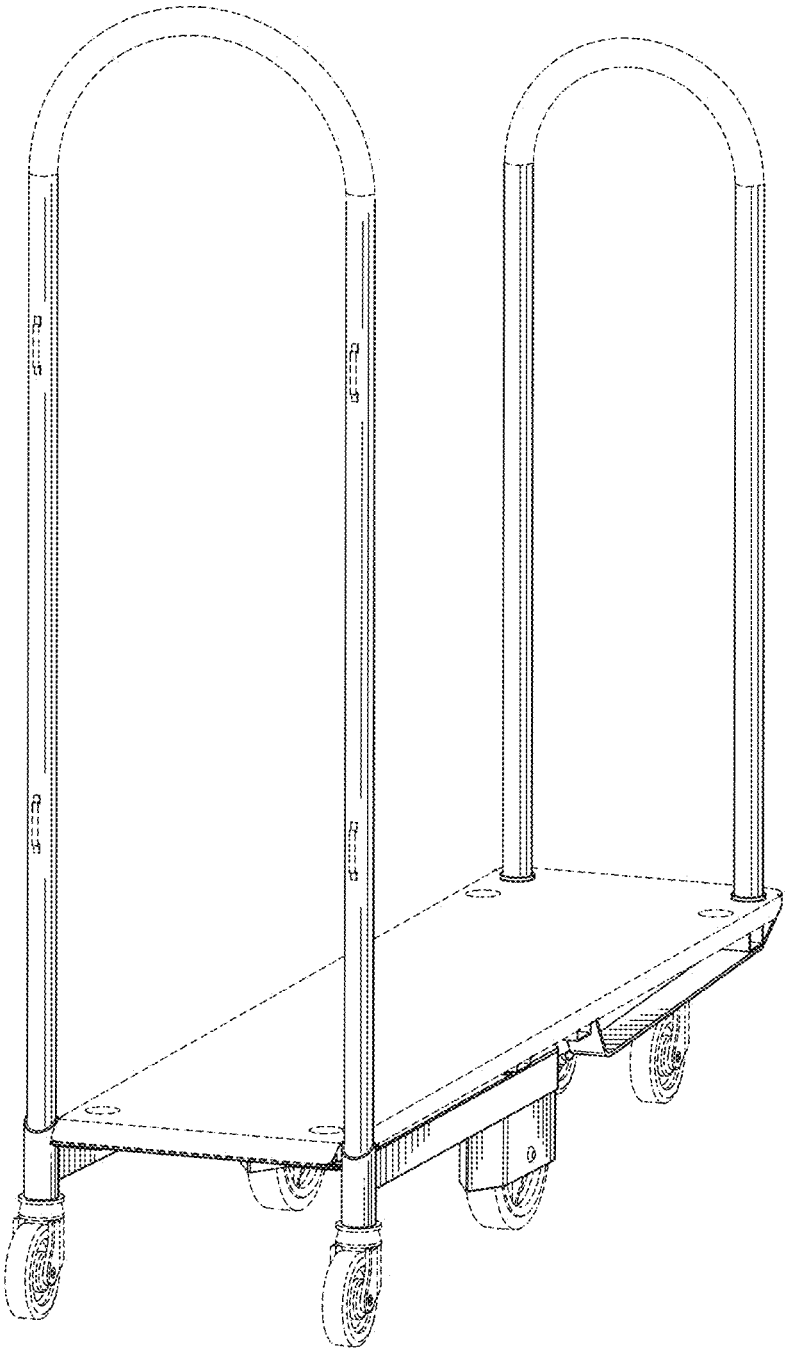
FIG.25
(NEW)

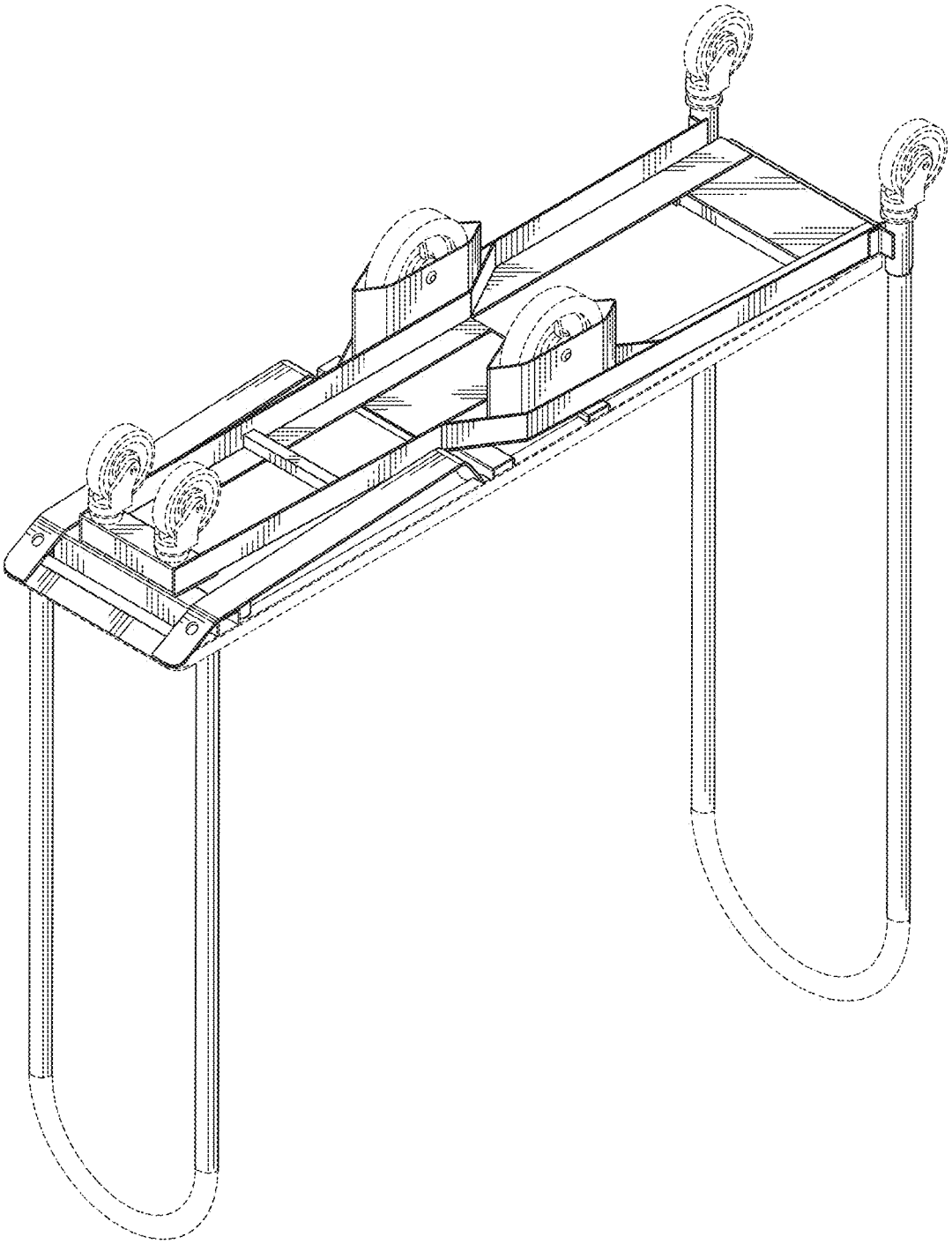
FIG.26
(NEW)

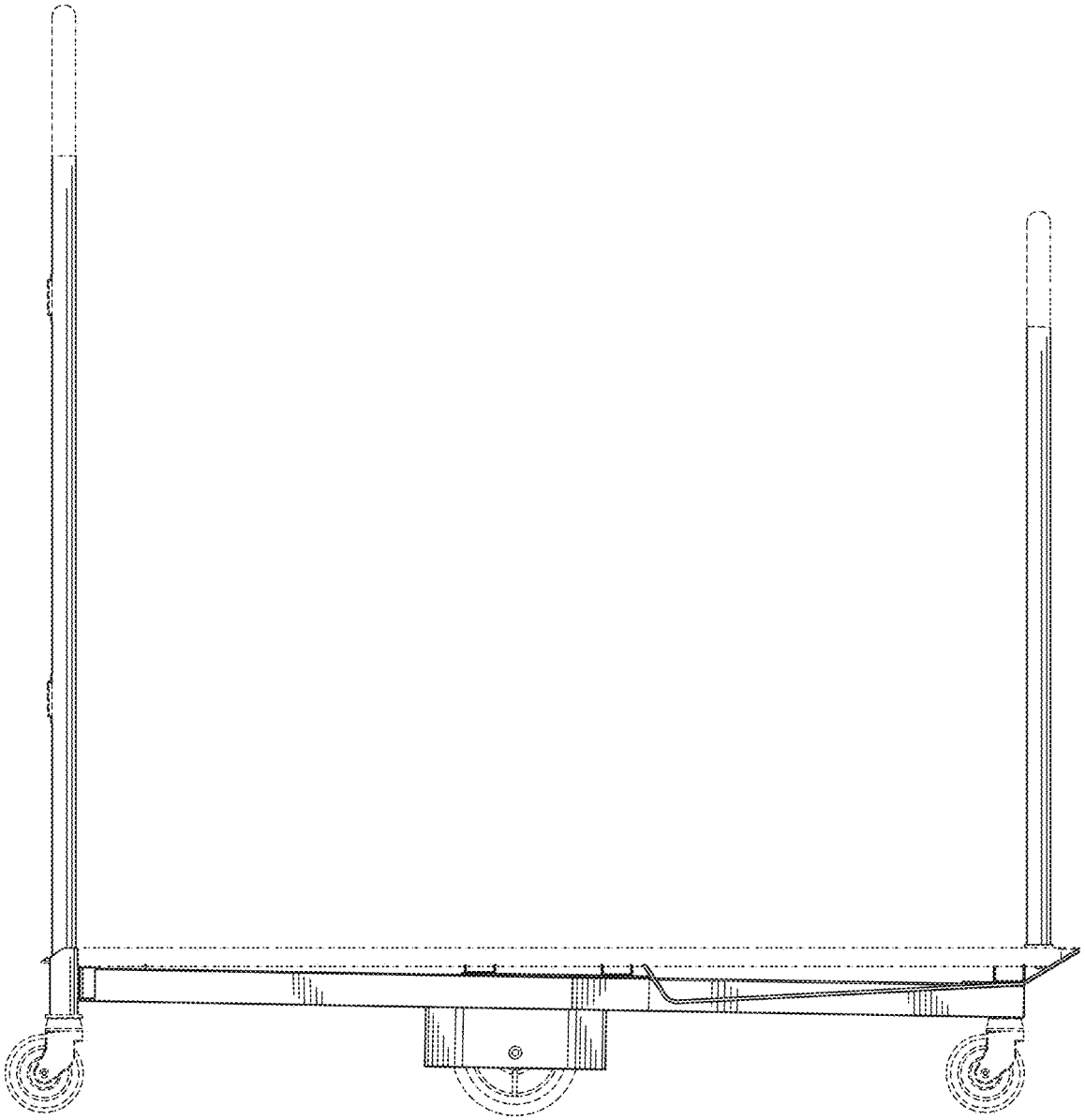
FIG.27
(NEW)

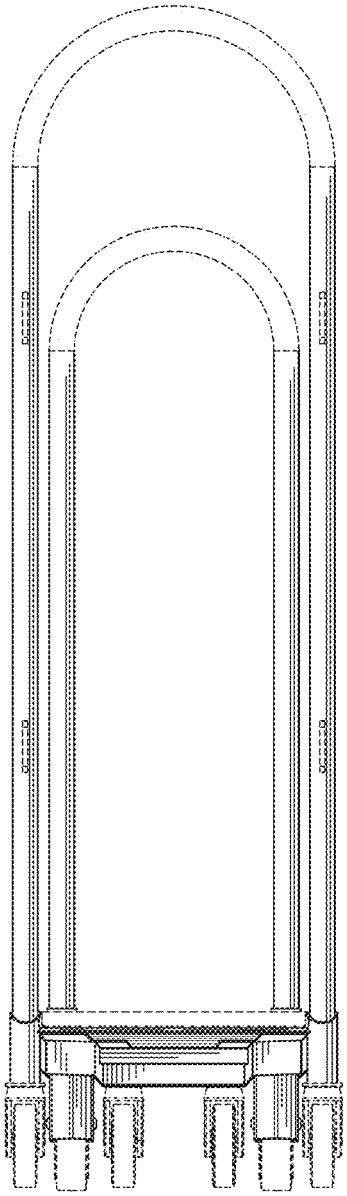
FIG.28
(NEW)
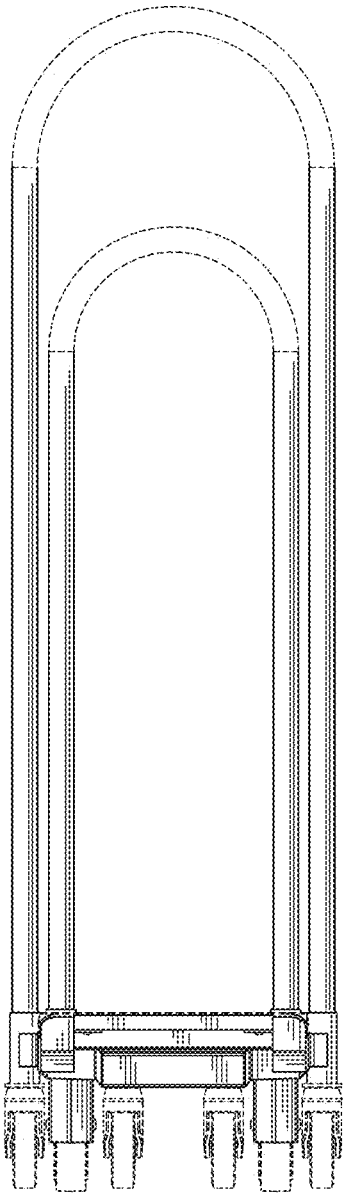
FIG.29
(NEW)

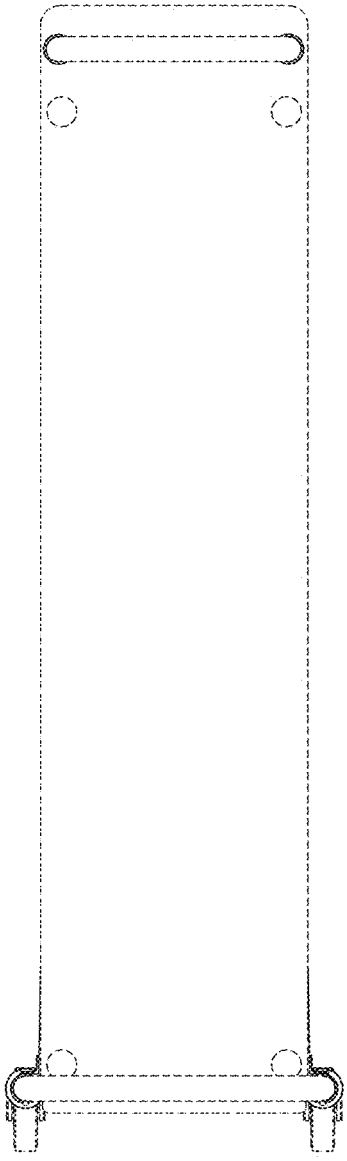
FIG.30
(NEW)
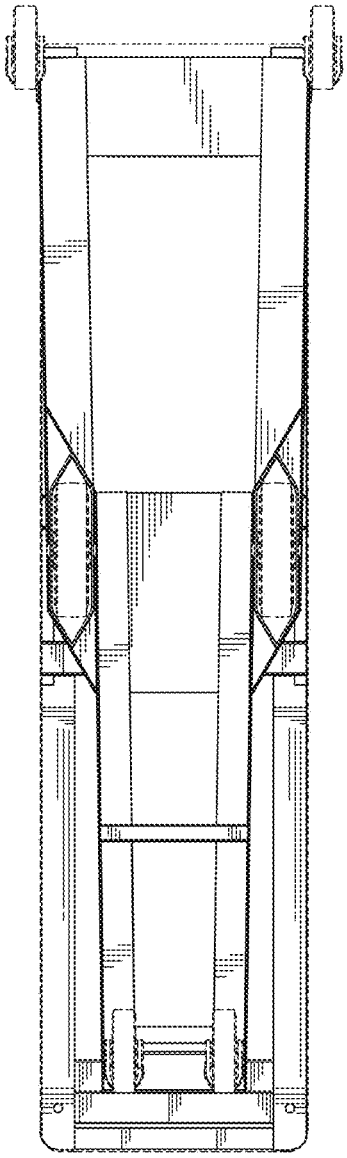
FIG.31
(NEW)

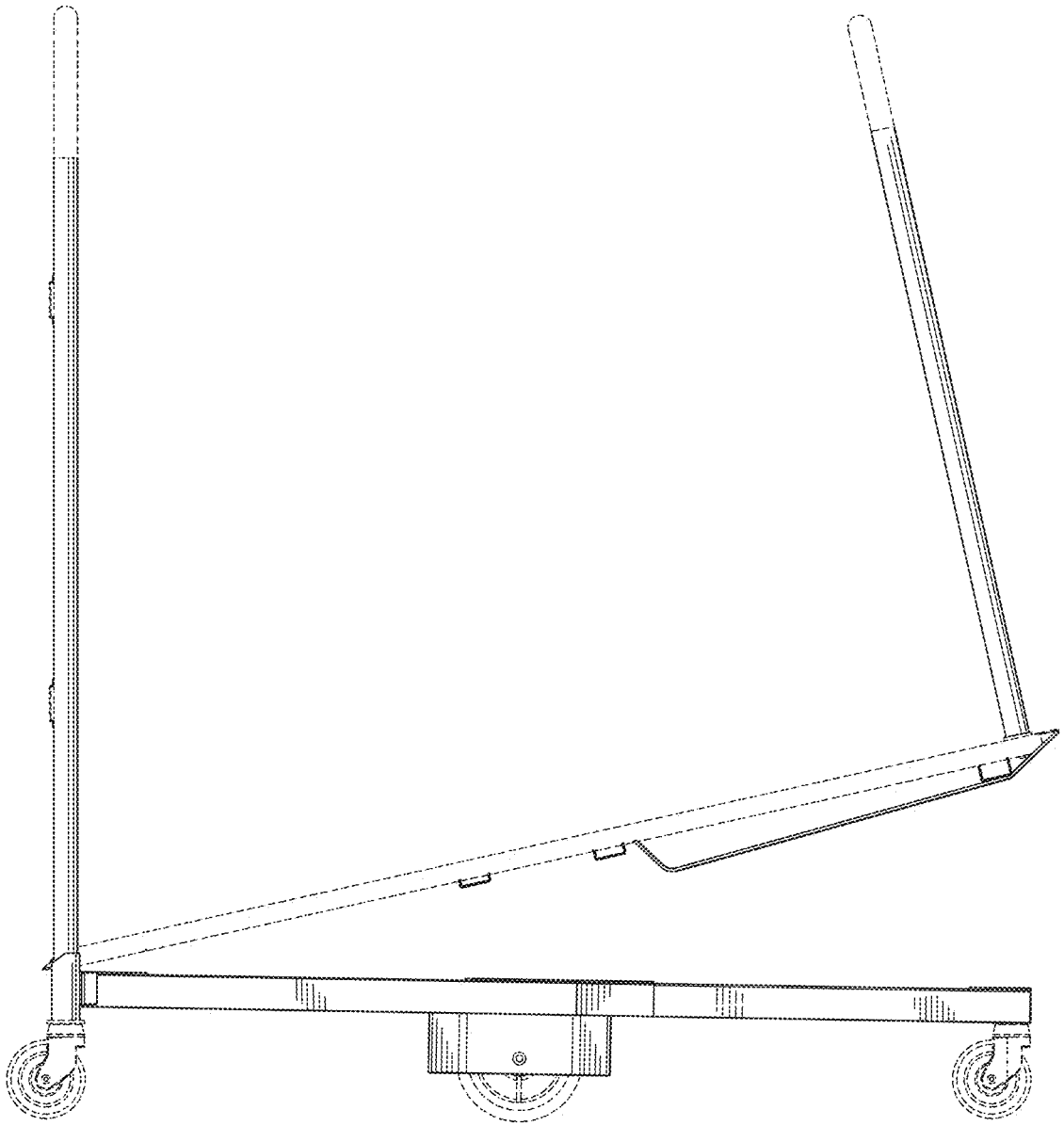
FIG.32
(NEW)

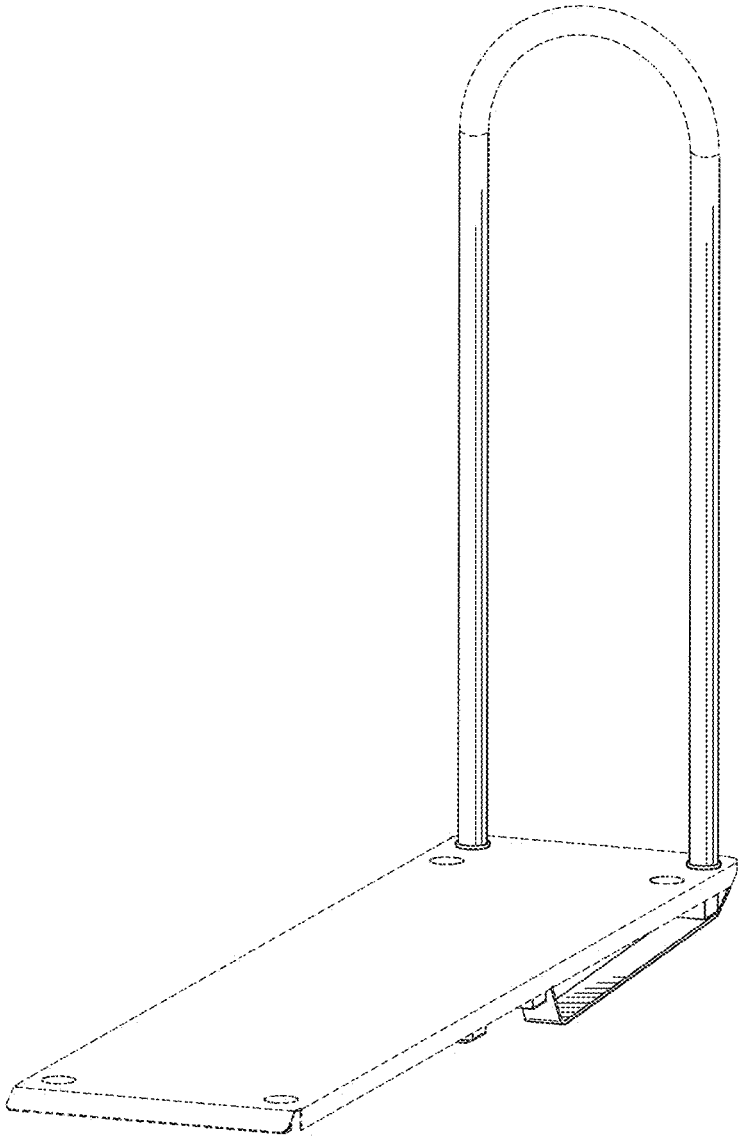
FIG.33
(NEW)

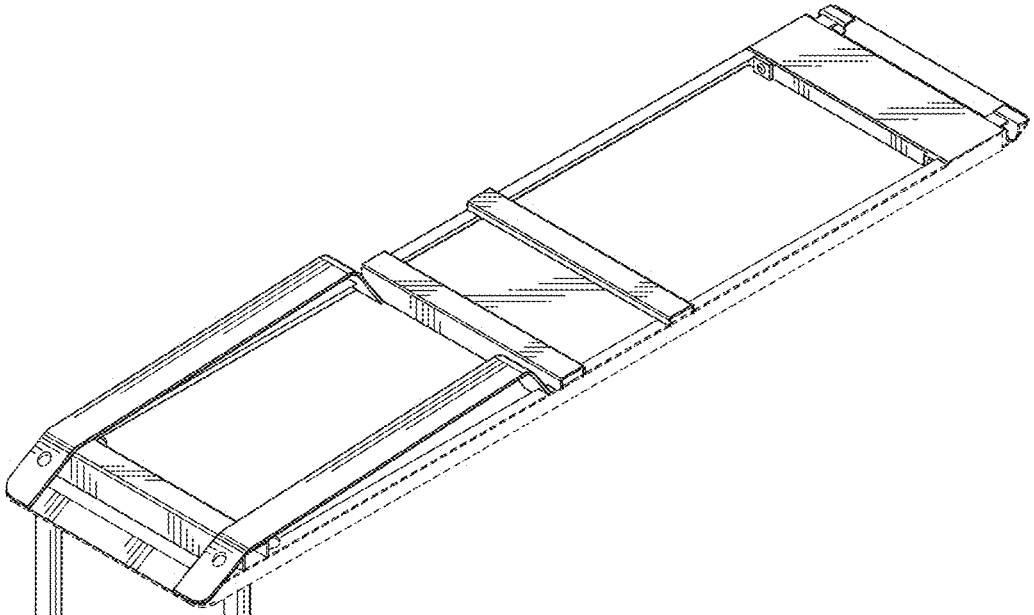
FIG.34
(NEW)
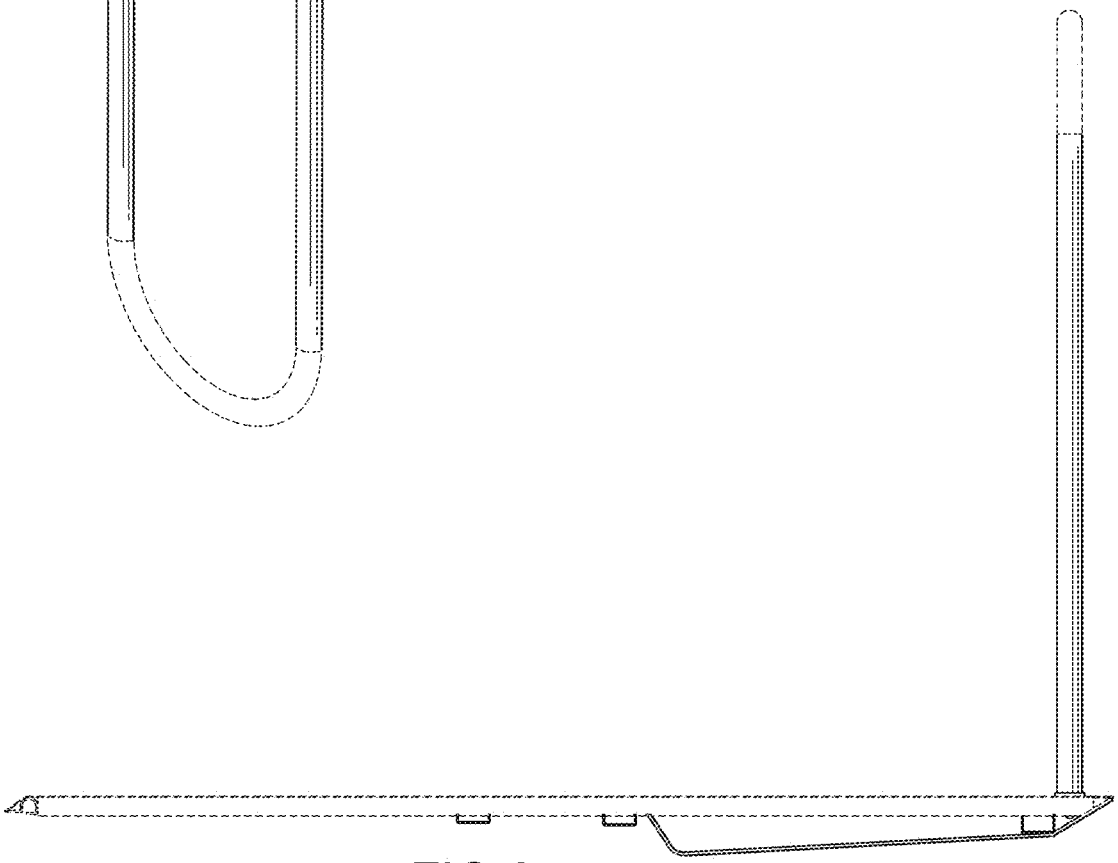
(NEW) FIG.35

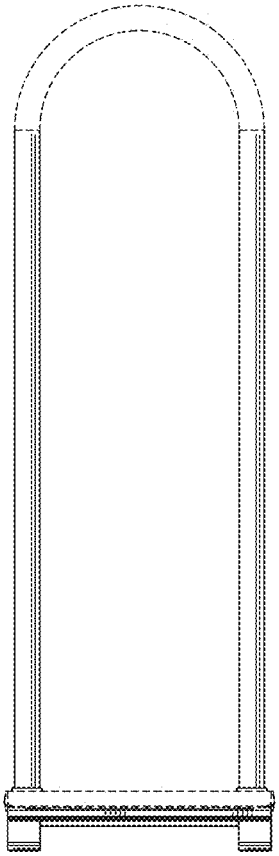
FIG.36
(NEW)
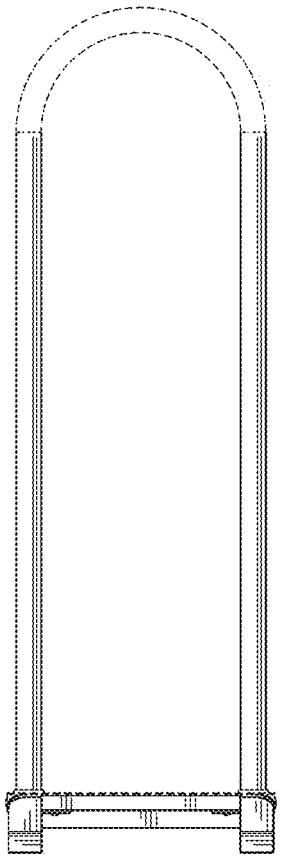
FIG.37
(NEW)

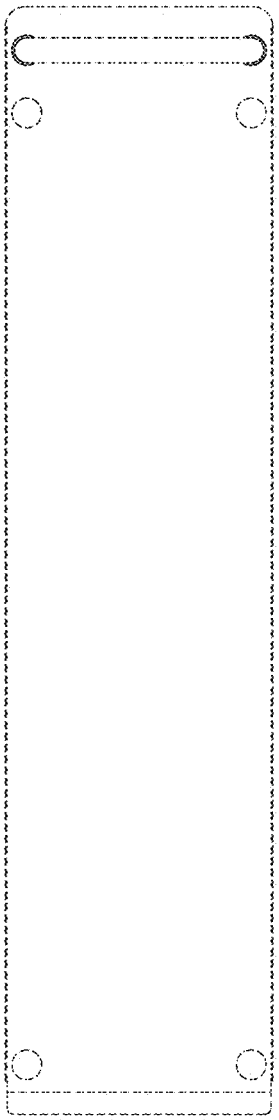
FIG.38
(NEW)
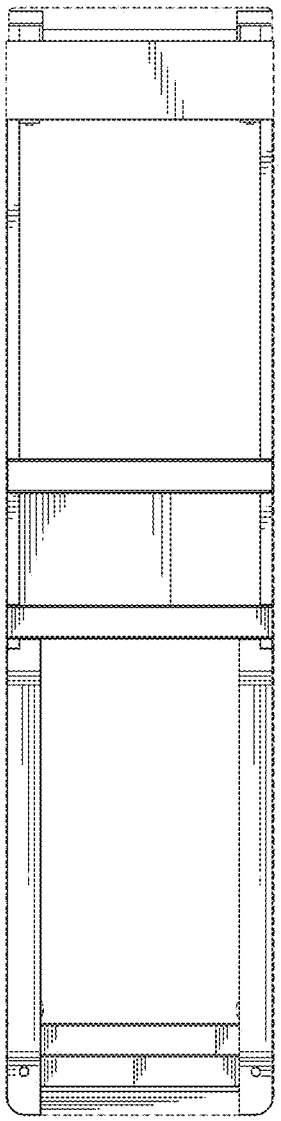
FIG.39
(NEW)

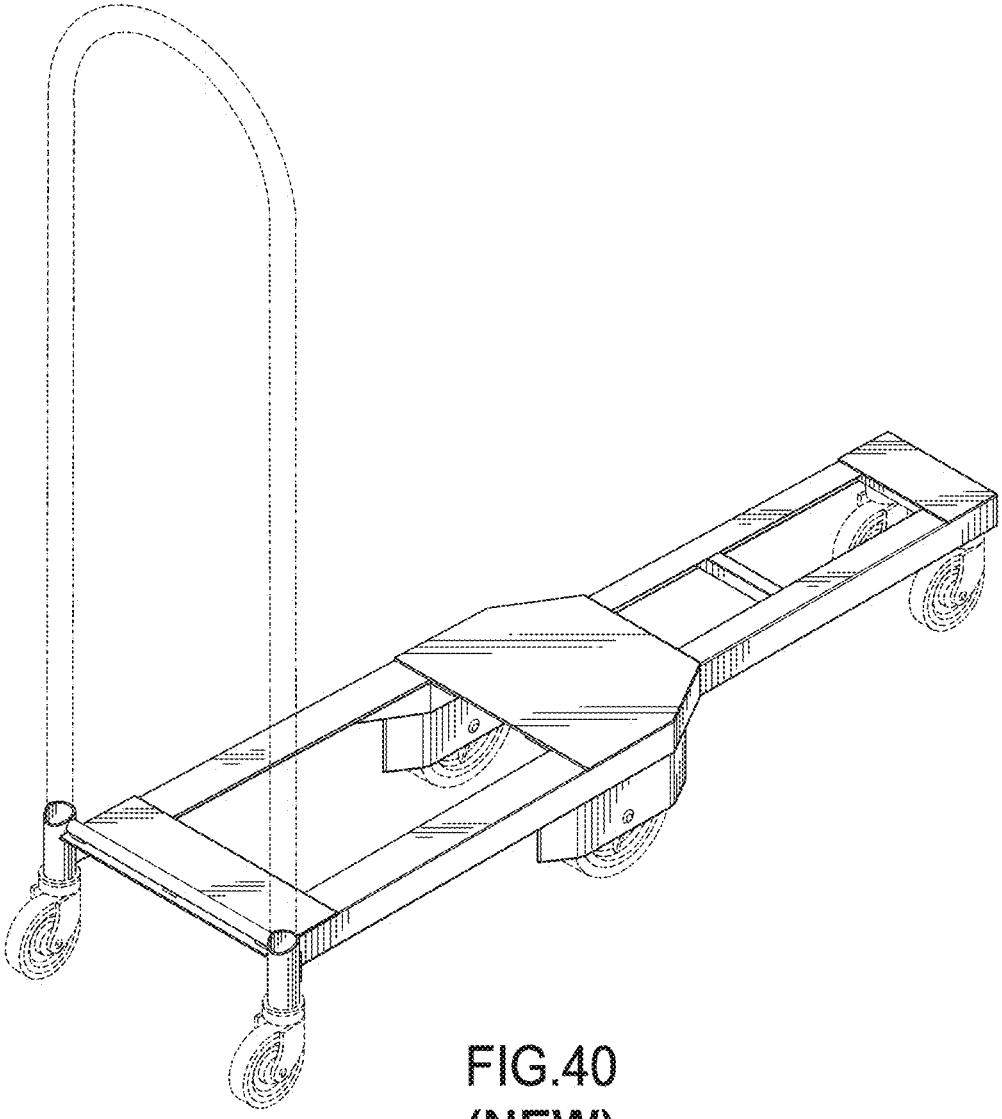
FIG.40
(NEW)

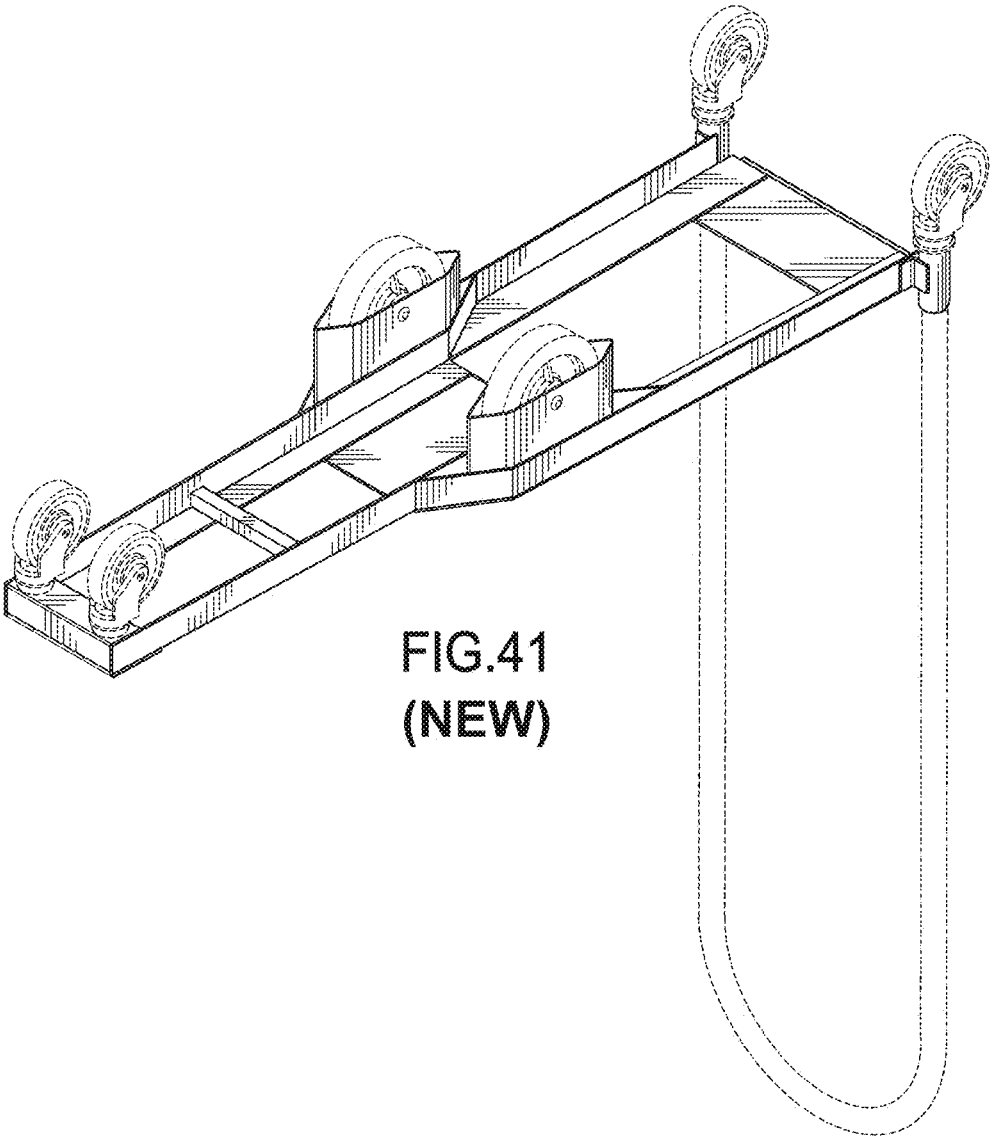
FIG.41
(NEW)

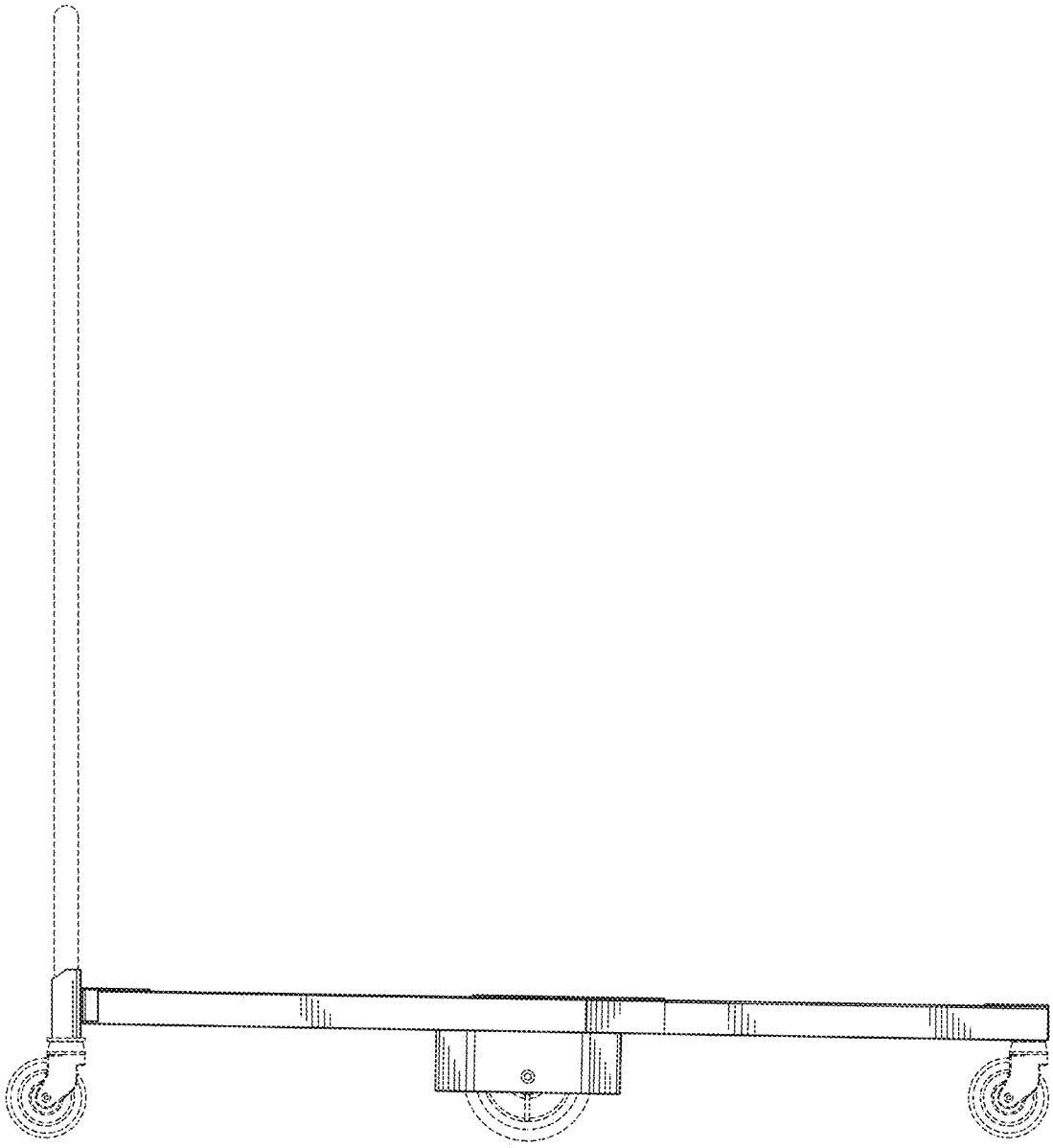
FIG.42
(NEW)

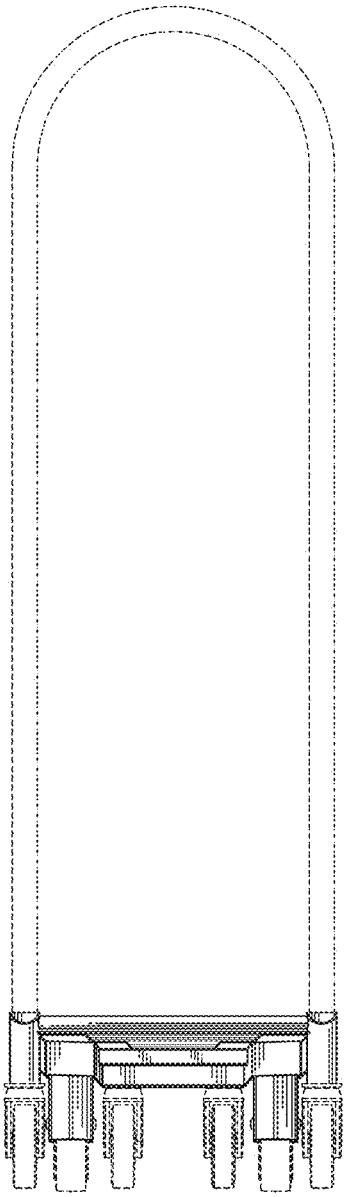
FIG.43
(NEW)
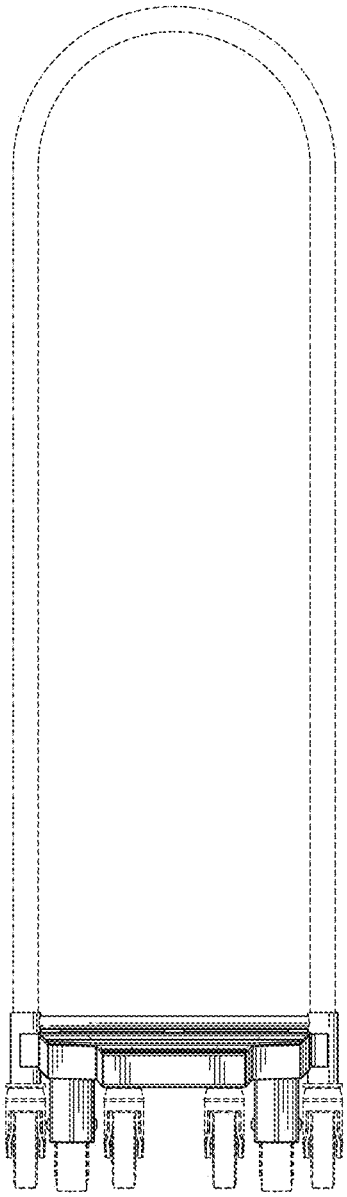
FIG.44
(NEW)

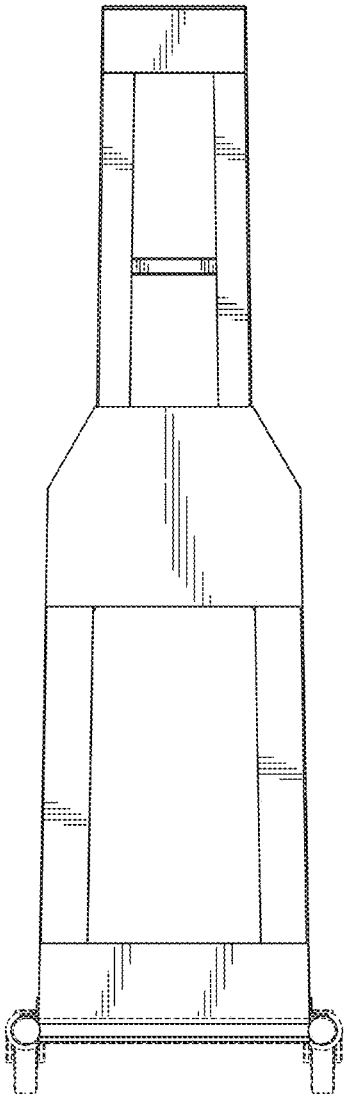
FIG.45
(NEW)
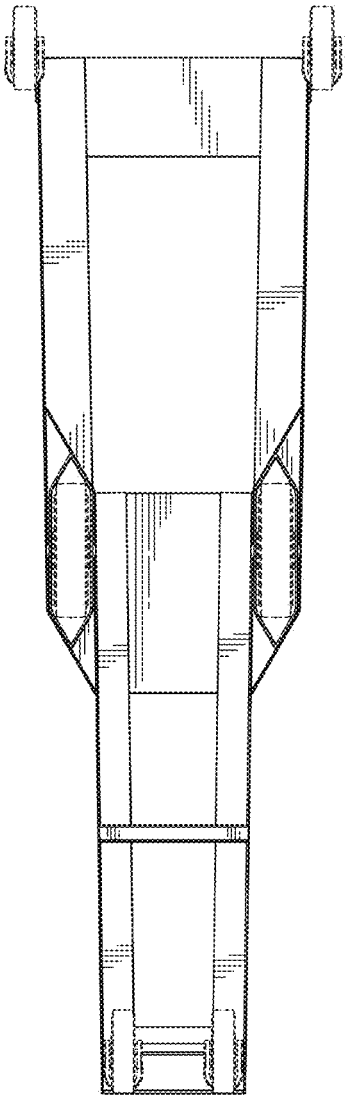
FIG.46
(NEW)

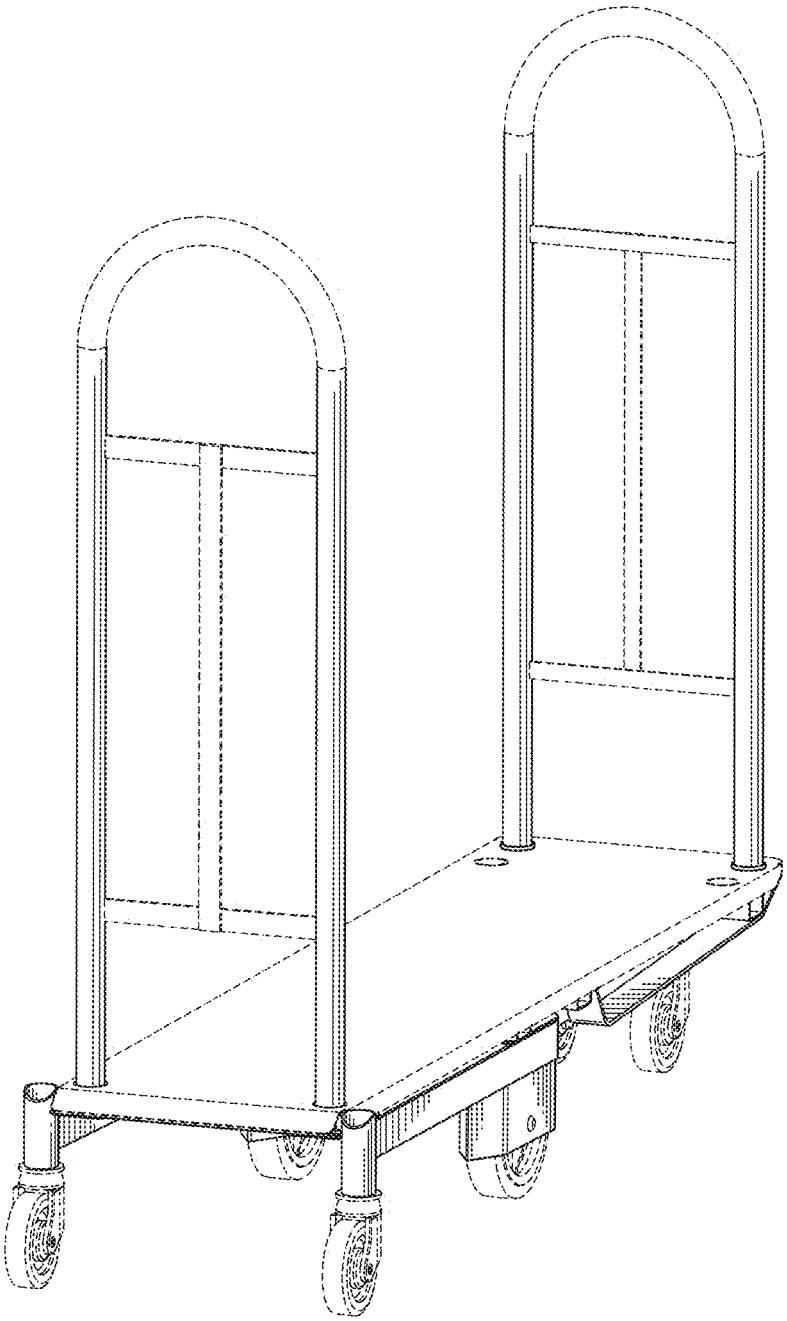
FIG.47
(NEW)

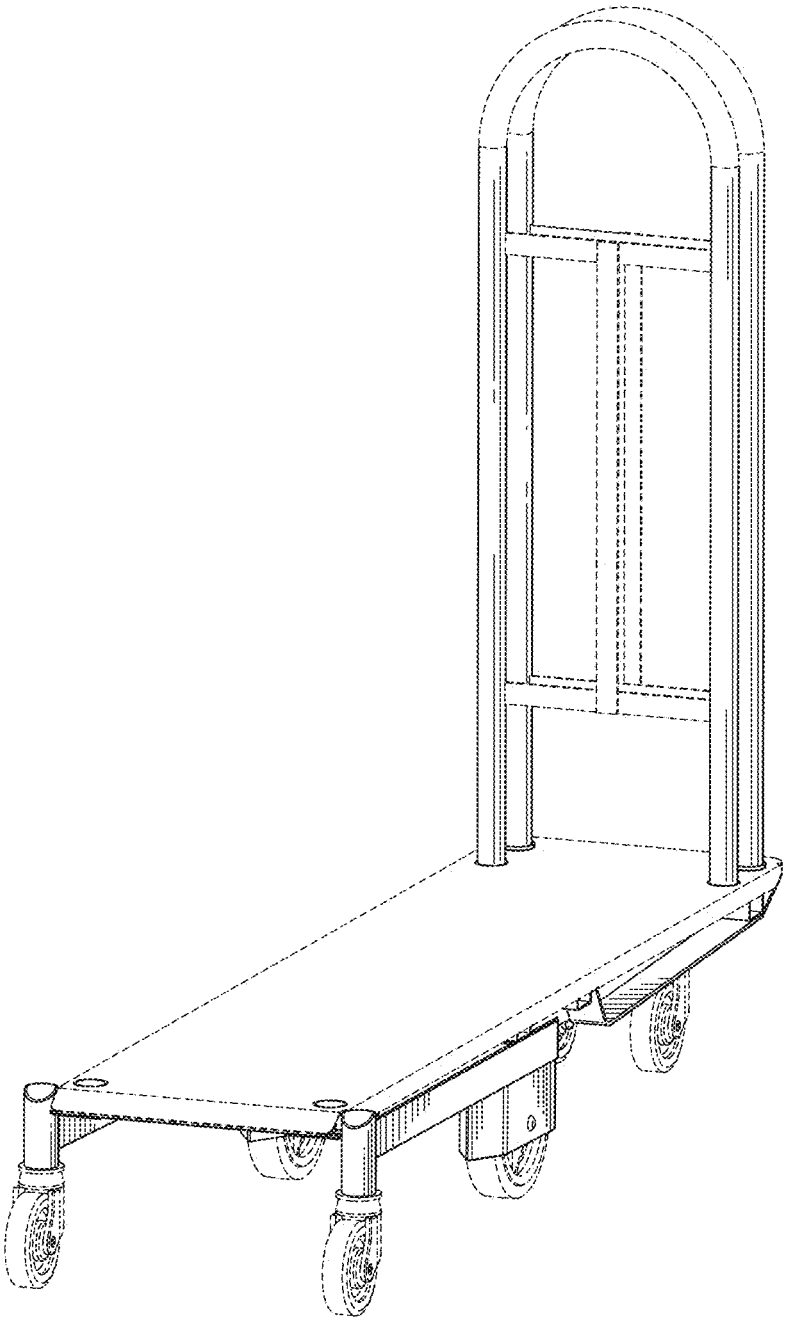
FIG.48
(NEW)